United States Patent [19]
Yamada et al.

[11] Patent Number: 5,904,264
[45] Date of Patent: May 18, 1999

[54] THERMALLY INSULATED DOUBLE-WALLED SYNTHETIC RESIN CONTAINER AND THERMALLY INSULATED DOUBLE-WALLED SYNTHETIC RESIN LID

[75] Inventors: Masashi Yamada; Hidefumi Kamachi; Yasuhiko Komiya; Takafumi Fujii; Kensuke Furuyama; Atsuhiko Tanaka; Rikiya Kato, all of Tokyo, Japan

[73] Assignee: Nippon Sanso Corporation, Tokyo, Japan

[21] Appl. No.: 08/710,056

[22] Filed: Sep. 10, 1996

[30] Foreign Application Priority Data

| Sep. 13, 1995 | [JP] | Japan | 7-235819 |
| Oct. 6, 1995 | [JP] | Japan | 7-260550 |
| Oct. 6, 1995 | [JP] | Japan | 7-260551 |
| Nov. 22, 1995 | [JP] | Japan | 7-30487 |
| Feb. 14, 1996 | [JP] | Japan | 8-027152 |

[51] Int. Cl.$^6$ .................................................. B65D 81/00
[52] U.S. Cl. ........................... 220/62.18; 220/62.22
[58] Field of Search .................................. 220/427, 423, 220/421, 366.1, 469, 62.18, 62.22

[56] References Cited

U.S. PATENT DOCUMENTS 4,258,695 3/1981 McCarton et al. .
4,770,318 9/1988 Earl .................................. 220/366.1 X

FOREIGN PATENT DOCUMENTS

| 0 667 483 | 8/1995 | European Pat. Off. . |
| 0 717 949 | 6/1996 | European Pat. Off. . |
| 2 147 989 | 5/1985 | United Kingdom . |
| 89 09011 | 10/1989 | WIPO . |

OTHER PUBLICATIONS

Patent Abstracts of Japan, vol. 95, No. 007, Aug. 31, 1995 and JP 07 101475 A (Nippon Sanso KK), Apr. 18, 1995 (Abstract).

*Primary Examiner*—Steven Pollard
*Attorney, Agent, or Firm*—Darby&Darby

[57] ABSTRACT

A thermally insulated double-walled synthetic resin container having a thermal insulator layer filled with a low thermal conductivity gas, wherein the inner container and the outer container are formed from a chemical resistant resin, a hole portion is provided at the enter of the bottom wall of the outer container, this hole portion is sealed by a sealing panel formed from chemical resistant resin; a protrusion portion is formed on the thermal insulator layer side of the bottom central portion of the outer container and a depression portion is formed on the reverse side of this protrusion portion; or a metallic thin film layer is formed on the surfaces facing the thermal insulator layer aside from the area around the mouth; as a result of which the thermally insulated double-walled synthetic resin container is provided with exceptional thermal insulation capabilities and strength.

15 Claims, 21 Drawing Sheets

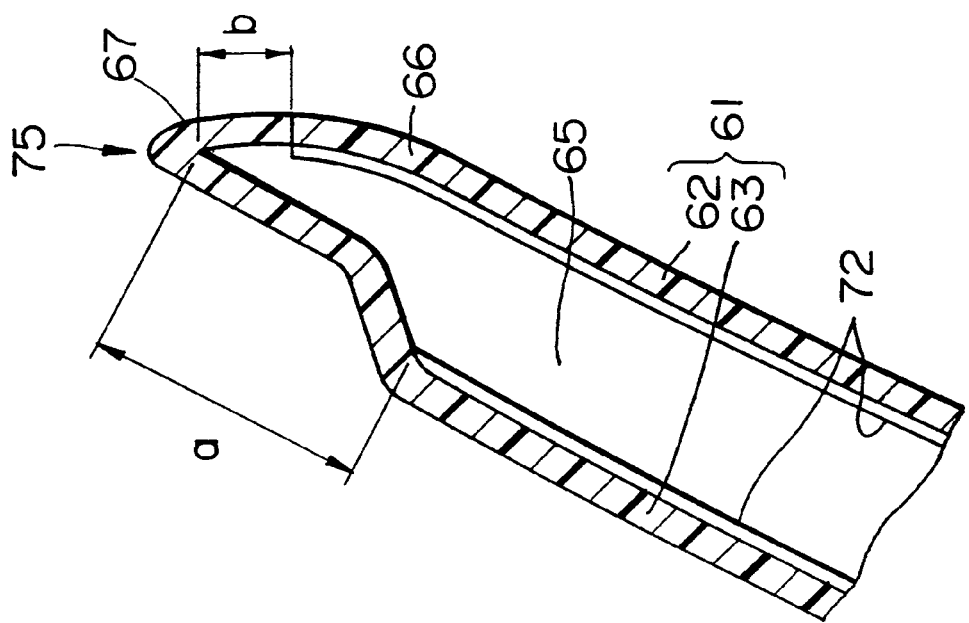
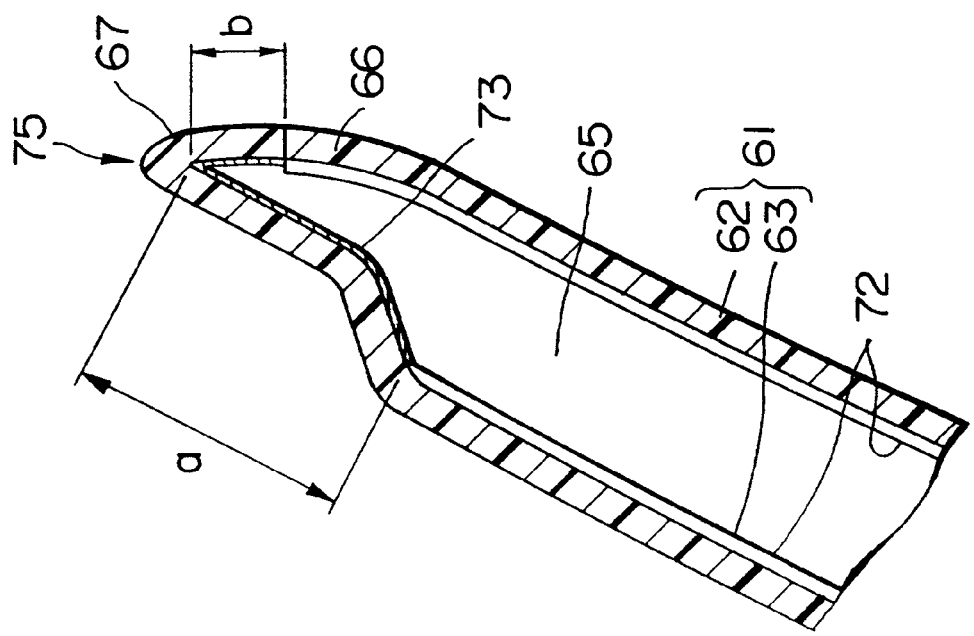

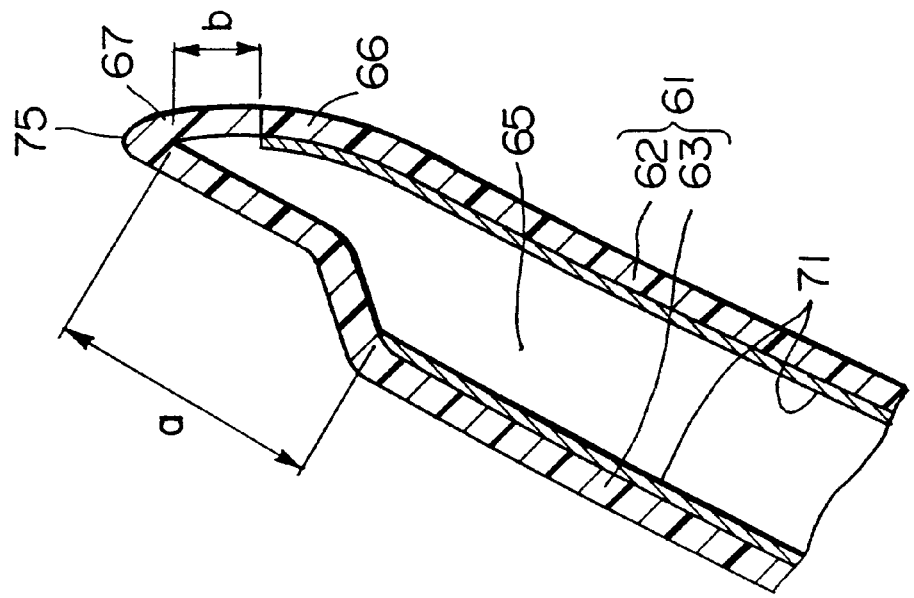
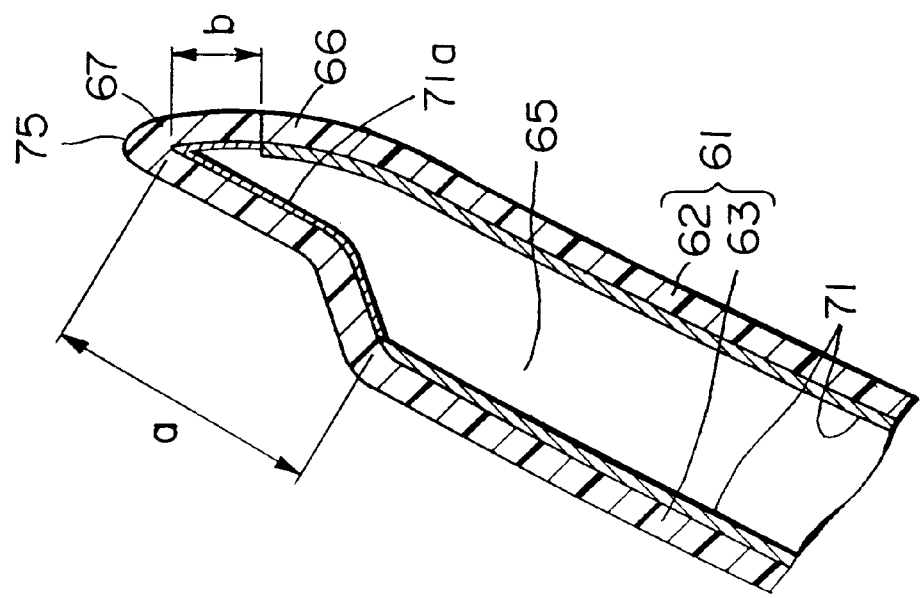

THERMALLY INSULATED DOUBLE-WALLED SYNTHETIC RESIN CONTAINER AND THERMALLY INSULATED DOUBLE-WALLED SYNTHETIC RESIN LID

BACKGROUND OF THE INVENTION

1. Technical Field of the Invention

The present invention relates to thermally insulated double-walled synthetic resin containers and their lids, as well as manufacturing methods therefor, used as heat preserving containers such as cooler boxes, vacuum flasks, heat preserving lunchboxes, rice bowls, soup bowls and cups.

2. Background Art

One type of thermally insulated double-walled synthetic resin container which has been conventionally proposed is one wherein a double-walled container formed from a synthetic resin inner container and outer container are filled with a gas which has a lower thermal conductivity than air in the space layer. This thermally insulated double-walled synthetic resin container has a plated metallic film formed on the surface of the space layer side of the double-wall for the purposes of increasing the gas barrier capabilities.

While polycarbonate resins are usually used for the inner and outer containers for their hot-water-resistance, it is not possible to form a plating film directly onto the outer surface of an inner container or the inner surface of an outer container formed from polycarbonate resins, so that a coating which includes resins that are capable of being plated are coated before applying the plating film.

However, since polycarbonate resins have low chemical resistance to organic solvents, bleaches, detergents and the like, even if a coating is applied to the surfaces on which plating films are to be formed, there is the risk that the solvent for the coating may cause cracks (solvent cracks) to form in the molded article, in which case the gas barrier capabilities of the thermally insulated double-walled synthetic resin container would be lost. Additionally, when sealing with a sealing panel by using adhesives during the post-processing wherein a low thermal conductivity gas is sealed within the space portion of the double-walled container, there is the risk of the solvent contained in the adhesive forming cracks near the sealed portion or in the sealing panel. Furthermore, cracks may be formed during actual use by the contents such as foods and beverages, bleaches, or various detergents.

Additionally, the gas barrier capabilities of polycarbonate resins themselves are not very good, so that a high-precision plating film must be applied in order to confer gas barrier capabilities, thereby increasing the manufacturing cost.

Additionally, as for thermally insulated containers such as cooler boxes, a double-walled container formed from a synthetic resin inner container and outer container having a gas with a lower thermal conductivity than air sealed into the thermally insulating space layer has been proposed. Since the thermally insulating space layer inside the thermally insulated double-walled synthetic resin container is exchanged and sealed with low thermal conductivity gas, a hole portion for exchange and sealing is formed at a portion of the outer container or the inner container.

This hole portion is provided at a position which is not externally visible. Additionally, after joining the inner container and the outer container, low thermal conductivity gas is exchanged into the space formed by the inner and outer containers by means of the hole portion and sealed by means of a sealing panel; the hole portion is usually provided in the center of the bottom of the outer container for ease of performing such procedures.

However, since a metallic mold must be made in order to put a hole portion in the bottom center of the outer container when the outer container is molded, the position of the gate on the outer container for extrusion molding the metallic mold must be provided at a place aside from the bottom center of the outer container. For this reason, the flow of synthetic resins into the molding space of the metallic mold for forming the outer container so as to be right/left symmetric with respect to the center becomes non-uniform with respect to the circumferential wall end portion of the outer container, so that the outer container molded article often has imperfect welds, thereby increasing the likelihood of insufficient strength or defects in appearance such as decentralization, warping and the like, and further raising the costs due to increased defectiveness.

Additionally, if the gate for mold extrusion is positioned at the bottom center of the outer container, a hole opening process for the gate cutting portion is required after molding. This hole opening process results in cost increases during molding because precise positioning is required due to the small hole diameter of approximately 1 mm. As a result, the outer container cannot be manufactured cheaply.

Additionally, while a hole portion is formed in the bottom center of an outer container for the gas filling procedure when a thermally insulating effect is to be gained by filling the space between the inner and outer containers of a thermally insulated double-walled synthetic resin container, there is a need to protect this hole portion. For this reason, a concave portion having the hole portion at the center is provided and the sealing is performed by fitting a sealing panel into this concave portion, which presents a problem in that the area around the concave portion is made thinner due to the formation of the concave portion so as to weaken the strength.

Additionally, as thermally insulated food containers which have been conventionally proposed, double-walled containers formed by joining a synthetic resin inner container and outer container with the thermally insulating space layer being air-insulated, as well as those provided with insulating materials such as styrofoam, urethane and the like, are known. These conventional thermally insulated double-walled synthetic resin containers do not offer sufficient heat preserving and cold preserving performance, so that they are not satisfactory for actual use. Additionally, the thickness of the thermally insulating space layer can be increased in order to improve the thermal insulation performance, but in actual practice, the effective capacity proportion between the internal storage capacity and the apparent volume of the double-walled container when turned over onto a flat surface is made worse, so that the product value is extremely degraded.

Additionally, thermally-insulated metallic vacuum containers have been proposed as a solution thereto.

However, food containers usually have large mouths, so that they have significant thermal conductivity loss from their mouths; especially in the case of metallic containers, the thermal conductivity loss is large in comparison to those using synthetic resins, so that they have low thermal insulation capabilities. There is also the simultaneous danger that the mouth portion can become hot. Furthermore, metallic thermally insulated containers are undesirable for various other reasons such as being heavy and expensive.

Additionally, conventional food containers which allow heat preservation are formed from a container body for putting in food and a lid, with the thermal insulator layer inside the container being filled with insulators such as styrofoam and urethane, or with thermal insulation due to air. Some such container bodies are leaved with aluminum in the thermal insulator layer in order to suppress radiative heat emissions.

Additionally, some of the lids attached to the above containers have a double-layered structure with a handle portion on the top portion of the lid, but these stress the heat preserving properties of the container body; there are no proposals which take into consideration the storage capabilities and heat preserving properties of the lid.

The lids of the above-mentioned containers have less heat preserving capabilities in comparison to the container bodies, so that the heat from the containers easily escapes through their lids and the appropriate temperature is lost by the time the contents are eaten. Additionally, if the container is stuffed with a lot of food, moisture from the food inside the container often evaporates due to the heat, so that the portion of contact between the lid and the container is sealed by water and the lid sticks to the container because of reduced pressure caused when heat escapes through the lid, thereby making it difficult to remove the lid from the container when the food is to be eaten. Additionally, conventional lids do not attach very securely, causing the performance to be further reduced even if offset only slightly, and risking spillage of the contents during transport.

Additionally, when lids having double-walled structures are stacked, the handle portion of the bottom lid supports the bottom wall of the top lid, so that the stacking height is made higher by the amount of protrusion of the handle portions, thereby reducing the storage capabilities and stability.

Additionally, as an example of a conventional manufacturing method for thermally insulated double-walled synthetic resin containers, there is a method wherein a resin with a high gas-barrier function is used to form a double-walled container by blow-molding with a low thermal conductivity gas, and the low thermal conductivity gas is sealed inside the double-walled container. With this method, gas-barrier capabilities are gained by using only resins, so that it is difficult to form radiation blocking materials in the thermally-insulating space.

As an example of another manufacturing method, the inner and outer containers are formed separately by means of extrusion molding, after which the respective mouth portions are attached with adhesives or the like to form a double-walled container, then the air between the inner and outer containers is replaced with low thermal conductivity gas. The inner container and outer container formed by this method allow radiation blocking materials composed of plating or metallic foil to be formed on the outer surface of the inner container or the inner surface of the outer container. After these radiation blocking materials are formed, the inner container is put into the outer container and the respective mouth portions are attached to form the space portion. Then, air is exhausted from the space portion through a hole formed in either the inner or the outer container, after which the space portion is filled with low thermal conductivity gas and sealed with a sealing panel.

The resins with high gas-barrier properties which are commonly known are highly moisture-absorbent, and their gas-barrier capabilities, strength, and dimensional stability are reduced when they absorb moisture. Additionally, under high temperatures, they tend to have insufficient strength. With regard to double-walled containers formed by a blow-molding method, it is extremely difficult to form metallic foil or plating onto the wall surface facing the insulating layer.

Additionally, when the inner container and the outer container are formed by means of extrusion molding, the inner and outer containers are attached to form a double-walled container, after which the air is removed from the space portion through a hole formed in either of the inner and outer containers. Then, low thermal conductivity gas is supplied and the hole sealed to complete the thermally insulated double-walled container. Thus, there are a lot of manufacturing steps and the manufacturing costs are expensive. Furthermore, the attachment by means of adhesives is often lacking in hot-water-resistance and chemical-resistance, so that there is the risk of decreased strength as well.

SUMMARY OF THE INVENTION

The present invention has the object of solving the following problems in order to offer a thermally insulated double-walled synthetic resin container and lid as well as manufacturing methods therefor, which are cheap and have exceptional thermal insulation capabilities and strength.

The first object of the present invention is to offer a cheap and highly durable thermally insulated double-walled synthetic resin container and manufacturing method therefor, which is capable of preventing the formation of cracks due to solvents used during manufacture or contents.

The second object of the present invention is to offer a thermally insulated double-walled synthetic resin container having an exceptional outward appearance and strength, as well as a manufacturing method for its outer container, wherein the production costs are low, defects do not occur due to welding and the like.

The third object of the present invention is to offer a container and container lid which has little thermal loss from the mouth portion, low production costs, is lightweight and has exceptional thermal insulation capabilities.

The fourth object of the present invention is to offer a container lid which has exceptional heat preserving capabilities, is capable of being easily and stably stored, does not stick to the main body of the container, and is stable when put on the container and during transport.

The fifth object of the present invention is to offer a thermally insulated double-walled synthetic resin container manufacturing method and a thermally insulated double-walled synthetic resin lid manufacturing method wherein a radiation prevention material is easily formed on the wall surfaces facing the thermal insulator layers of the container and lid having double-walled structures, and the manufacturing process for the thermally insulated double-walled synthetic resin container or the thermally insulated double-walled synthetic resin lid is simplified by connecting the inner and outer container end portions or the end portions of the top and bottom walls immediately after the space between the inner container end portion and the outer container end portion or the top wall end portion and the bottom wall end portion of the lid is filled with low thermal conductivity gas without opening any holes, while also increasing the airtight property of the connecting portions and increasing the reliability of the connecting strength.

The thermally insulated double-walled synthetic resin container of the present invention comprises an inner container formed of synthetic resin; and an outer container formed of synthetic resin; wherein the inner container is connected to the outer container, the inner container is accomodated within the outer container with a space therebetween, and a thermal insulator layer is formed in the space portion between the inner container and the outer container; a radiation prevention material composed of metal is provided on at least a surface of the inner container among surfaces which face the space portion; and the space portion is filled with at least one type of low thermal conductivity gas selected from the group consisting of xenon, krypton and argon.

Since a radiation prevention material composed of metal is provided on at least a surface of the inner container among surfaces which face the space portion, and the space portion is filled with at least one type of low thermal conductivity gas selected from the group consisting of xenon, krypton and argon, the thermal insulation of the low thermal conductivity gas in the space portion and the reduction in radiative thermal conduction due to the radiation prevention material gives the container superior thermal insulation capabilities in comparison to conventional air-insulated or urethane-insulated containers, and allows the thermal insulator layer to be made thin so as to result in a lighter and cheaper container.

In order to achieve the above-mentioned first object of the present invention, the thermally insulated double-walled synthetic resin container can be made into the first embodiment, wherein the inner container and the outer container are formed from a chemically resistant resin, a hole portion is provided at the center of the bottom wall of the outer container, and the hole portion is sealed by a sealing panel formed from a chemically resistant resin.

According to the first embodiment of the thermally insulated double-walled synthetic resin container of the present invention, cracks will not form on the inner or outer surfaces of the container due to the contents, or chemicals such as solvents, detergents or bleaches used during manufacture or in practice. As a result, a highly durable thermally insulated double-walled synthetic resin container is obtained.

Additionally, a mixed resin of polycarbonate and polyester can be used as the chemical resistant resin, and since this mixed resin is resistant to organic solvents, cracks will not form due to solvents in the coating even if the outer surface of the inner container or the inner surface of the outer container is coated with an ABS resin type coating in order to form a plating film. Furthermore, this resin has exceptional gas-barrier properties, so that if the metallic radiation prevention material is a plating film, some non-sticking of the plating is acceptable so as to lower the defect rate in the plating. If the radiation prevention material is a metallic foil, it is possible to reduce the radiative thermal conduction with a simple attachment operation. Furthermore, in the case of metallic foil, there is no need for any apparatus for applying the ABS resin type coating and attaching the metallic foil, so that the thermally insulated double-walled synthetic resin container can be made cheaply.

Additionally, when the inner and outer containers are formed from resins which are difficult to plate, the plating precision can be improved by applying ABS resin type coating to the surfaces of the inner and outer containers on which to form the plating films and plating only the coated surfaces, thereby forming a plating film at portions of the inner and outer container excluding the connecting portion or the hole portion.

In order to achieve the above-mentioned second object of the present invention, the thermally insulated double-walled synthetic resin container can be made into the second embodiment, wherein the bottom central portion of the outer container is provided with a step portion comprising a depression portion on an outside surface and a protrusion portion on a thermal insulator layer side surface such that the thickness of the bottom wall is approximately uniform, a hole portion which passes through the bottom wall is provided at the center of the step portion, and the hole portion is sealed by a sealing panel fitted into the depression portion.

According to the second embodiment of the thermally insulated double-walled synthetic resin container of the present invention, a protrusion portion is formed on the thermal insulator side of the bottom central portion of the outer container, and a depression portion aligned with the center of the protrusion portion is formed on the opposite side of the protrusion portion, so that the thickness at the bottom center of the outer container is the same as the thickness at other portions, thereby increasing the strength of the bottom of the outer container, especially the area around the hole, and allowing the sealing panel to be fit into the depression portion for sealing.

Additionally, the sealing panel is fitted and adhered to the depression portion of the outer container, so that the hole portion can be protected by the sealing panel after the hole portion has been sealed by adhesives.

Furthermore, the outer container has a hole portion with a diameter which decreases from the depression portion side on the bottom outside surface to the protrusion portion side of the thermal insulator space and the hole portion is sealed by adhesive, so that when the thermally insulated double-walled synthetic resin container is sealed, the double-walled container is overturned for sealing, but the adhesive is easily received because the hole portion has a diameter which decreases from the depression portion side on the bottom outside surface to the protrusion portion side of the thermal insulator space so that the diameter of the hole portion widens on the bottom outside surface side of the outer container and the hole portion is more easily sealed.

Additionally, by making the adhesive a cyano-acrylate type adhesive, it is possible to obtain a highly airtight and immediately strong adhesive force, so as to allow the thermal insulator gas to be sealed within the space portion of the double-walled container. Additionally, the radiative thermal conduction can be further reduced by providing a radiation prevention material on the inner surface of the outer container.

Additionally, the radiation prevention material can be attached cheaply and easily by making the radiation prevention material one type selected form among a plating film aluminum foil, copper foil and silver foil. By forming the radiation prevention material from a plating film, the gas-barrier capabilities can be increased in addition to reducing the radiative thermal conduction.

In order to achieve the third object of the present invention, the thermally insulated double-walled synthetic resin container can be made into the third embodiment, wherein a metallic thin film layer is formed on the surfaces facing the thermal insulator layer other than the areas around the mouth portion.

According to the third embodiment of the thermally insulated double-walled synthetic resin container of the present invention, the heat loss due to thermal conduction can be reduced while also reducing the heat loss due to radiation.

Additionally, by forming a 1~10 $\mu$m thick copper plating film which is thinner than the metallic thin film layer in the area around the mouth portion of the inner container, the gas-barrier capabilities at these parts can be increased while reducing the heat loss due to radiative thermal conduction.

Additionally, by using a metallic foil as the metallic thin film layer, the metallic thin film layer can be formed by a simple attachment operation, and the heat loss due to radiation is reduced. The formation of this metallic foil does not require any special apparatus when compared to the formation of plating films, so that the work process can be simplified, as a result of which the production costs of the container can be reduced. Additionally, when the metallic thin film layer is a copper plating film, the gas-barrier capabilities of the container can be increased while reducing the radiative thermal conduction, so as to allow exceptional thermal insulation properties to be maintained over long periods of time.

Additionally, by forming the container out of chemical resistant and hot-water resistant synthetic resins, damage such as cracks will not form in the container and lid due to the contents, or chemicals such as solvents, detergents or bleaches used during manufacture or in practice. As a result, a highly durable container is obtained.

The lid of the present invention, for tightly closing the mouth portion of the container, comprises a top wall and bottom wall composed of synthetic resin, which are arranged with a space portion therebetween and attached at their peripheral portions in an airtight double-walled structure; wherein the top wall has a cylindrical protrusion portion which protrudes upward from a central portion; and the space portion is made into a thermal insulator layer by filling said space portion with at least one type of low thermal conductivity gas selected from the group consisting of xenon, krypton and argon.

Due to the airtight double-walled structure, the space portion formed between the top wall and the bottom wall of the lid can be made into a thermal insulator space, so as to increase the heat preserving capabilities of the lid.

Additionally, since the space portion is filled with at least one type of low thermal conductivity gas selected from the group consisting of xenon, krypton and argon, it is possible to obtain superior thermal insulation performance in comparison to conventional air-insulated and urethane-insulated containers and the thermal insulator layer can be made thin so as to result in a lighter and cheaper container.

In order to achieve the fourth object of the present invention, the lid of the present invention can be made into the first embodiment, wherein a cylindrical protrusion portion which protrudes upward toward the space portion is formed at a central portion of the bottom wall, and the inner diameter of the cylindrical protrusion portion on the bottom wall is greater than the outer diameter of the protrusion portion on the top wall.

According to the first embodiment of the lid of the present invention, when the lids are stacked together, the top wall protrusion portions of the bottom lids can be accomodated within the cylindrical space of the bottom wall protrusion portions of the top lids.

Additionally, by forming a notch which connects the inside and outside of the container in the radial direction of the circumferential wall portion of the lid, the lid will not stick to the container even if heat escapes from food piled into the container.

Additionally, by making the thickness formed by the bottom wall and the top wall of the lid 10~15 mm except for the area around the connecting portion of the lid, the area around the base of the top wall protrusion portion of the lid and the area around the upper end of the bottom wall protrusion portion, the thermal insulation space of the lid can be made large so as to improve the heat preserving capabilities without degrading the outward appearance.

Additionally, by making the top wall protrusion portion of the lid either cylindrical or polygonal column-shaped, the top wall protrusion portion can be given a canopy portion so that the thermal insulation space of the lid can be made large, the shape of the handle portion of the lid can be selected, and the designability of the heat preserving container can be increased.

Additionally, radiative thermal conduction from the lid can be suppressed by forming radiation prevention materials composed of metal on at least the surface of the bottom wall among the surfaces of the top and bottom walls which face the space portion. Additionally, if a radiation prevention material composed of metal is also formed on the top wall, the radiative thermal conduction can be further reduced.

Furthermore, the radiation prevention material can be cheaply and easily attached by forming the radiation prevention material composed of metal from one type chosen from among a plating film, aluminum foil, copper foil and silver foil.

In order to achieve the third object of the present invention, the lid of the present invention can be made into the second embodiment, wherein a metallic thin film is provided on the parts of the surfaces facing the thermal insulator layer aside from the area around the mouth portion.

According to the second embodiment of the lid of the present invention, a metallic thin film is provided on the surfaces formed from synthetic resins which face the thermal insulator layer except for the areas around the top wall peripheral portion, so as to reduce the heat loss due to thermal conduction and to reduce the heat loss due to radiation.

Additionally, by forming a 1~10 $\mu$m thick copper plating film which is thinner than the metallic thin film layer in the area around the top wall peripheral portion, the gas-barrier properties can be increased at these parts while reducing the heat loss due to radiative thermal conduction.

Additionally, by using a metallic foil as the metallic thin film layer, the metallic thin film layer can be formed by a simple attachment operation, and the heat loss due to radiation is reduced. The formation of this metallic foil does not require any special apparatus when compared to the formation of plating films, so that the work process can be simplified, as a result of which the production costs of the lid can be reduced. Additionally, when the metallic thin film layer is a copper plating film, the gas-barrier capabilities of the lid can be increased while reducing the radiative thermal conduction, so as to allow exceptional thermal insulation properties to be maintained over long periods of time.

Additionally, by forming the lid out of chemical resistant and hot-water resistant synthetic resins, damage such as cracks will not form in the lid due to the contents, or chemicals such as solvents, detergents or bleaches used during manufacture or in practice. As a result, a highly durable lid is obtained.

In order to achieve the fifth object of the present invention, a method for producing a thermally insulated double-walled synthetic resin container comprises steps of:

a) molding an inner container and an outer container out of resin;

b) putting the inner container inside the outer container within an airtight space and evacuating the space;

c) filling the space with at least one type of low thermal conductivity gas selected from the group consisting of xenon, krypton and argon; and d) attaching the inner container and the outer container in airtight fashion by heating and welding the end portions thereof.

Additionally, a method for producing a thermally insulated double-walled synthetic resin lid comprises steps of:

a) molding a top wall and a bottom wall out of resin;

b) stacking the top wall and the bottom wall at their respective end portions within an airtight space and evacuating the space;

c) filling the space with at least one type of low thermal conductivity gas selected from the group consisting of xenon, krypton and argon; and d) attaching the top wall and the bottom wall in airtight fashion by heating and welding the end portions thereof.

In the above-mentioned thermally insulated double-walled container manufacturing method, the inner container is put inside the outer container within an airtight space and the space is evacuated, then the space is filled with a low thermal conductivity gas and the end portions of the inner and outer containers are heated and welded, so that there is no need to form exhaust holes in either the inner or outer container. Additionally, in the above-mentioned thermally insulated double-walled lid manufacturing method, the top wall and the bottom wall are stacked at their respective end portions within an airtight space and the space is evacuated, then the space is filled with a low thermal conductivity gas and the end portions of the top and bottom walls are heated and welded, so that there is no need to form exhaust holes in either the top or bottom wall.

Therefore, the inner container and outer container, or top wall and bottom wall which do not have exhaust holes can be used to produce a thermally insulated double-walled synthetic resin container filled with low thermal conductivity gas between the inner and outer containers, or a thermally insulated double-walled synthetic resin lid filled with low thermal conductivity gas between the top and bottom walls in very few steps, so as to reduce the cost of producing the thermally insulated double-walled synthetic resin container and the thermally insulated double-walled synthetic resin lid. Additionally, containers and lids with extreme freedom of design can be obtained because no exhaust holes are formed.

Additionally, the inner and outer containers or the top and bottom walls are put between a lower jig and an upper jig in an airtight space, and the space is evacuated, then filled with low thermal conductivity gas, so that air does not become mixed in and the low thermal conductivity gas can be reliably filled. Furthermore, any extra gas can easily be recovered so as to eliminate any waste of low thermal conductivity gas.

Additionally, by placing the inner and outer containers or top and bottom walls between an upper and lower jig to heat and weld the end portions of the inner and outer containers or top and bottom walls by means of friction, the end portions of the inner and outer containers or the top and bottom walls can be connected together by welding, so as to increase the airtightness of the inner and outer container end portions or the top and bottom wall end portions, thereby allowing a thermally insulated double-walled synthetic resin container and thermally insulated double-walled synthetic resin lid having high connective strength between the inner and outer containers or top and bottom walls to be obtained.

Additionally, by forming the inner container and the outer container by using chemical resistant resins in the thermally insulated double-walled synthetic resin container manufacturing method, the resulting container will not form cracks due to solvents, detergents or contents. Additionally, after attaching the inner and outer containers, by forming a radiation prevention material composed of metal on the surface of at least the inner container among the surfaces of the inner container and outer container facing the space portion, then attaching the inner and outer containers with a space portion and filling the space portion with a low thermal conductivity gas of at least one type chosen from among xenon, krypton and argon, it is possible to produce a thermally insulated double-walled synthetic resin container with high thermal insulation capabilities.

Additionally, since the chemical resistant resin is a mixed resin of polycarbonate and polyester, solvents in the coating will not form cracks even if an ABS resin type coating is applied to the plating film formation surface of the inner and outer containers, so that the durability of the container is increased. Additionally, this mixed resin has excellent gas-barrier capabilities, so that the radiative thermal conduction can be reduced by metallic foil instead of a plating film, thereby simplifying the manufacturing process.

Additionally, a method for producing an outer container, for a thermally insulated double-walled synthetic resin container formed by connecting an outer container and an inner container, by molding due to extrusion of synthetic resin into a metallic mold; comprises steps of:

a) making a male mold for molding an inner surface of the outer container;

b) making a female mold for molding an outer surface of the outer container;

c) combining the male mold and the female mold to form the metallic mold having an extrusion molding space portion inside, and making a molded product by extruding synthetic resin into the extrusion molding space portion; and d) forming a hole portion at a bottom central portion of the molded product; wherein in step a, a molding concave portion is formed at the center of an extrusion molding surface facing the extrusion molding surface of the male mold, and an extrusion molding gate is formed at the center of the molding concave portion; in step b, a molding convex portion is formed at the center of an extrusion molding surface facing the extrusion molding surface of the female mold, and a hole-opening protrusion portion having a diameter less than the diameter of the extrusion molding gate and having a length greater than the thickness of the extrusion molding space portion is formed at the center of the molding convex portion; in step c, the male mold and the female mold are combined by inserting the tip of the hole-opening protrusion portion into the extrusion molding gate, then extruding synthetic resin into the extrusion molding space portion through the extrusion molding gate; and in step d, a hole portion is formed at a bottom central portion of the outer container by cutting off a gate pin formed by the extrusion molding gate.

According to the outer container molding method of the present invention, an extrusion molding gate is provided at a position corresponding to the center of the bottom of the outer container, that is the central portion of the molding concave portion in the male mold, so that the extrusion molding can be conducted from the center of the bottom of the outer container which is left/right symmetric, thereby allowing the flow of synthetic resin into the molding space of the metallic mold to be uniform and reducing defects in appearance such as welding defects, decentralization or worping and markedly reducing the occurrence of insufficient strength in order to reduce the defect rate.

Additionally, since the synthetic resin is extruded through the extrusion molding gate into the extrusion molding space portion while inserting the tip of the hole-opening protrusion which has a small diameter into the extrusion molding gate which has a large diameter, a hole portion can be easily obtained by cutting the gate pin so that there is no need for any other hole-opening procedures such as with drills.

Furthermore, since the hole-opening portion of the female mold has a diameter which decreases from the base portion to the tip portion, the hole portion of the outer container is molded into a shape such that the diameter decreases from the depression portion side of the outer surface to the protrusion portion side of the inner surface, so that the adhesive is easily drawn into the hole portion when the double-walled container formed by connecting the outer container and the inner container is overturned to adhesively seal off the hole portion, thereby simplifying the procedure for sealing the hole portion.

The thermally insulated double-walled synthetic resin container and the thermally insulated double-walled synthetic resin lid of the present invention are especially suitable for use as a food container in hotels, inns, hospitals, school lunches or normal households.

BRIEF DESCRIPTION OF THE DRAWINGS

FIG. 7 is a portional section view showing a first example for the arrangement of the metallic film layer on the container shown in FIG. 6.

FIG. 8 is a portional section view showing a second example for the arrangement of the metallic film layer on the container shown in FIG. 6.

FIG. 12 is a portional section view showing a third example for the arrangement of the metallic film layer on the container shown in FIG. 6.

FIG. 13 is a portional section view showing a fourth example for the arrangement of the metallic film layer on the container shown in FIG. 6.

PREFERRED EMBODIMENTS OF THE INVENTION

Figure 1:
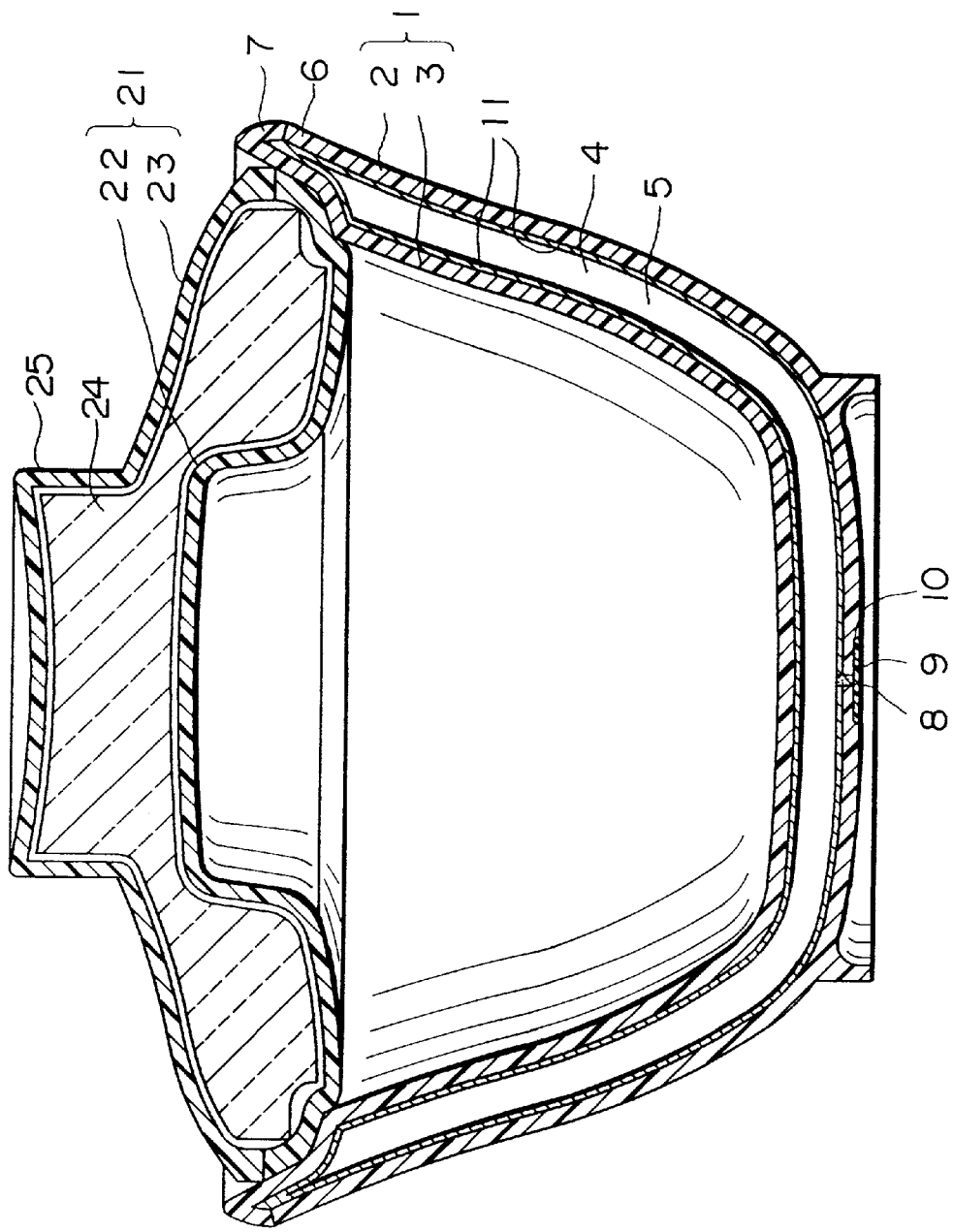
FIG. 1 is a section view showing a first example of a thermally insulated double-walled synthetic resin container according to the present invention.

FIG. 1 shows a first example of a thermally insulated double-walled synthetic resin container according to the present invention. This thermally insulated double-walled synthetic resin container comprises a container 1 and a lid 21 which covers the mouth at the upper portion thereof.

The container 1 of this first example is formed from an outer container 2 and an inner container 3, having a bowl-shaped double wall structure with a thermal insulator layer 5 sealed with low thermal conductivity gas in the space portion 4 between the inner and outer containers. These inner and outer containers 2, 3 are formed from chemical-resistant and hot-water-resistant synthetic resins by means of extrusion molding or blow molding. Since the resin used is chemical-resistant, there is no concern that cracks could be formed in container 1 after molding, such as by putting things in or by washing with detergent, so that the strength of the container 1 can be maintained. As used above, chemical-resistance refers to the property of not being damaged, such as by forming cracks, even under contact with chemicals such as organic solvents, bleaches or detergents.

A depression portion 10 which is depressed in the direction of the thermal insulator layer 5 is formed in the bottom center of the outer container 2, and a hole portion 8 is drilled into the central portion of this depression portion 10. A sealing panel 9 is inserted and affixed within the depression portion 10 so as to seal off the hole portion 8. Like the inner and outer containers 2, 3, this sealing panel 9 is also formed from a chemical and hot-water resistant synthetic resin, and this sealing panel 9 is affixed to the depression portion 10 by means of adhesives in an airtight fashion. Because this sealing panel 9 is formed from a chemical resistant synthetic resin, there is no concern that cracks could form in this sealing panel 9 due to solvents contained in the adhesive, even if an adhesive is used to seal the hole portion 8 with the sealing panel 9 after the space portion 4 is filled with low thermal conductivity gas through this hole portion 8. Additionally, cracks will not form in the sealing panel 9 due to detergents either.

As the adhesive used to seal the sealing panel 9, a cyano-acrylate adhesive can be used. These adhesives are highly airtight after hardening, and allows the low thermal conductivity gas filled into the space portion 4 of the container 1 to be sealed because they allow a strong adhesive force to be obtained immediately.

As the low thermal conductivity gas to be sealed into the space portion 4 of the container 1, at least one type of gas chosen from among xenon, krypton and argon is used. The thermal conductivities of these gases, xenon ($\kappa=0.52\times10^{-2}$ $W\cdot m^{-1}\cdot K^{-1}$; 0° C.), krypton ($\kappa=0.87\times10^{-2}$ $W\cdot m^{-1}\cdot K^{-1}$; 0° C.) and argon ($\kappa=1.63\times10^{-2}$ $W\cdot m^{-1}\cdot K^{-1}$; 0° C.), are lower than that of air ($\kappa=2.41\times10^{-2}$ $W\cdot m^{-1}\cdot K^{-1}$; 0° C.), and these gases are sealed at a sealing pressure of about atmospheric pressure either singly or as a combined gas of two or more types. The thermally insulating capabilities of the container 1 can be increased by using these low thermal conductivity gases. Additionally, these low thermal conductivity gases are inert, so that their use is favorable for the environment.

The outer container end portion 6 and the inner container end portion 7 are connected by a vibration welding method or a spin welding method, thereby forming the space portion 4. With a vibration welding method or a spin welding method, the portion of attachment of the inner and outer containers 2, 3 can easily and reliably be made into an airtight structure, while also increasing the strength of attachment.

For the extrusion molding of the outer container 2 and the inner container 3, a mixed resin of polycarbonate and polyester is used as chemical resistant resins. This mixed resin should preferably be a blend of polycarbonate and polyester is a mixture weight ratio of 7:3. This mixed resin has a chemical resistance property of not changing even when coming into contact with chemicals such as organic solvents, bleaches and detergents, so that cracks (solvent cracks) will not be caused by solvents in the coating material even when an ABS resin-type coating is applied to the outer surface of the inner container 3 or the inner surface of the outer container 2 in order to allow for the formation of a plating film. Additionally, there is no concern of cracks forming on the inner surface of the inner container 3 or the outer surface of the outer container 2 after formation of the container 1 due to the contents or washing with detergents. Additionally, this mixed resin is hot-water resistant, and has much better gas barrier properties than polycarbonates. Therefore, the possibility of the above-mentioned low thermal conductivity gas filled into the space portion 4 permeating the container wall and escaping is extremely low. For this reason, there is not need to form a plating film on the surfaces which face the space portion 4 of the inner and outer containers 2, 3 in order to increase the gas barrier capabilities if the product lifetime is allowed to be short. The polyester contains polyethylene terephthalate or polybutylene terephthalate.

Among the surfaces which face the space portion 4 formed between the outer container 2 and the inner container 3, at least the surface of the inner container 3 has radiation prevention material 11 formed from metallic foil. As a metallic foil, it is possible to use aluminum foil, copper foil, silver foil or the like. These foils are attached by adhesives or double-sided tape, and serve to suppress radiative heat loss through the space portion 4.

The radiation prevention material 11 can be formed from a plating film instead of a metallic foil. A copper plating or a silver plating can be used as the plating, with the plating film attached by electroplating on top of a chemical plating. As a result, the radiative heat loss from the container 1 can be suppressed, and the gas-barrier properties of the inner and outer containers is increased. As mentioned above, the polycarbonate and polyester mixed resin has excellent gas-barrier properties, so that the partial failure of the plating film to stick, which has conventionally been regarded as a flaw, can be allowed to some extent, thereby decreasing the rejection rate of the plating. Consequently, it is possible to lower the manufacturing costs.

On the above-mentioned mixed resins wherein plating films cannot be formed directly on the container walls facing the space portions of the inner and outer containers 2, 3, an ABS resin-type coating is applied to only the surface on which the plating film is to be formed, then a plating film is formed only on the coated surface. The adherence of the plating film to the coating surface of ABS resin-type coating material is improved, so that a precise plating film can be formed by only applying coatings to the surfaces aside from the hole portion 8 and the attachment portion between the inner container end portion 7 and the outer container end portion 6.

A lid 21 is detachably fitted with the mouth of the container 1 formed in this way. The lid 21 is formed from a bottom wall 22 and a top wall 23, with a thermal insulator material 24 formed from styrofoam, urethane or the like provided in the space formed between the top and bottom walls, and the end portions of the bottom wall 22 and the top wall 23 being formed so as to connect. A protrusion which acts as a handle 25 is formed on the top wall 23. The heat preserving effects of the container 1 are able to be increased by covering the container 1 with this type of lid 21.

Instead of the thermal insulator material 24 of this lid 21, it is also possible to use the same thermally insulating structure as the thermal insulator layer 5 wherein the low thermal conductivity gas is sealed into the container 1 as mentioned above.

Next, the method of manufacturing the thermally insulated double-walled synthetic resin container of the present invention shown in FIG. 1 will be explained.

A chemical resistant resin is used to mold the inner container 3 and the outer container 2 when the container 1 is manufactured. A mixed resin of polycarbonate and polyester is suitable for use as a chemical resistant resin.

By forming the inner and outer containers 2, 3 from chemical resistant resins, cracks will not form in the inner and outer container due to the contents of the container 1 or by washing with detergent, and the strength of the inner and outer containers can be maintained. Additionally, if the resins used to form the inner and outer containers are resins on which it is difficult to form plating films, then the solvents contained in the coating when an ABS resin-type coating is applied in order to form a radiation prevention material by a plating film on this resin will not cause cracks in the coated surface.

Thereafter, a radiation prevention material 11 composed of a metal is formed on at least the surface of the inner container 3 among the surfaces of the inner container 3 and the outer container 2 which face the space portion 4. In order to form radiation prevention materials 11 on these surfaces, either a method wherein a metallic foil such as aluminum foil, copper foil or silver foil is adhesively affixed by means of an adhesive or double-sided tape, or a method wherein copper or silver is plated by means of chemical plating or electroplating is used. When the metallic plating is to be formed by means of electroplating, an ABS resin-type coating is applied to the surface portions to be plated; plating layers can be easily and reliably formed by plating at these coated portions.

Next, the inner container 3 and the outer container 2 are combined, and the inner container end portion 7 and the outer container end portion 6 are attached by means of vibration welding or spin welding, so as to form a double-walled container having a space portion 4 between the inner and outer containers 2, 3.

Then, this double-walled container is overturned and the air in the space portion 4 is exhausted from a hole portion 8 in the outer container 2, after which the space portion 4 is filled to approximately atmospheric pressure through the hole portion 8 with at least one type of low thermal conductivity gas selected from among xenon, krypton and argon, then a cyano-acrylate type adhesive is coated onto the hole portion 8 and the depression portion 10 and a sealing panel 9 is immediately inserted into the depression portion 10 so as to completely seal off the hole portion 8 by adhesively affixing the sealing panel 9. Consequently, a container 1 with a double-walled structure having high thermally insulative properties is produced.

The lid 21 is produced by making a top wall 23 and a bottom wall 22 having a handle 25 using an appropriate synthetic resin, filling the space therebetween with a thermal insulator 24 such as polystyrofoam or urethane, then attaching the end portions of the top wall 23 and the bottom wall 22. During the manufacture of the lid 21, the interior may be filled with a low thermal conductivity gas instead of the thermal insulator 24 by applying the manufacturing method of container 1; in this case, the thickness of the thermally insulating space layer can be made small so as to make the lid 21 more compact.

Figure 2:
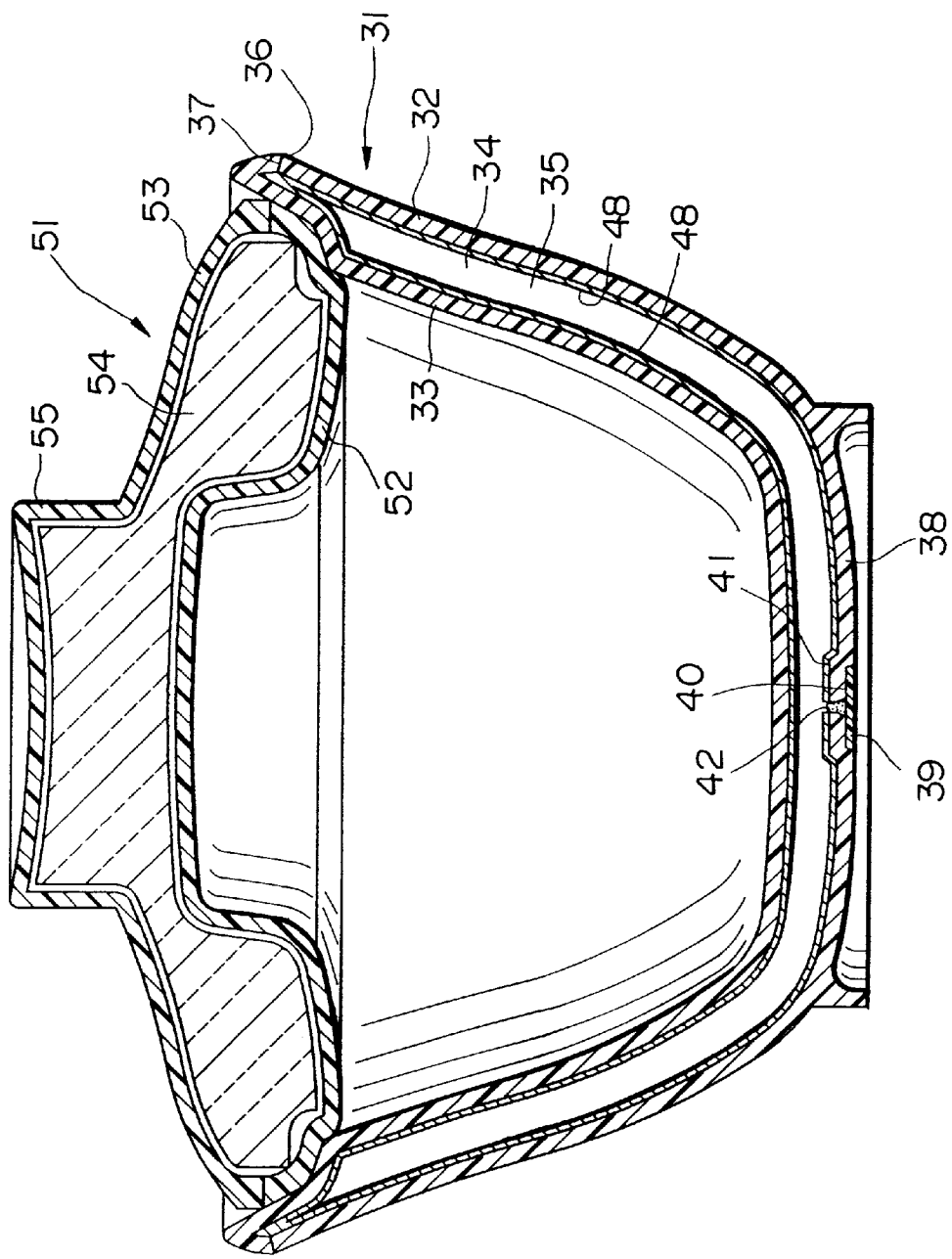
FIG. 2 is a section view showing a second example of a thermally insulated double-walled synthetic resin container according to the present invention.
Figure 3:
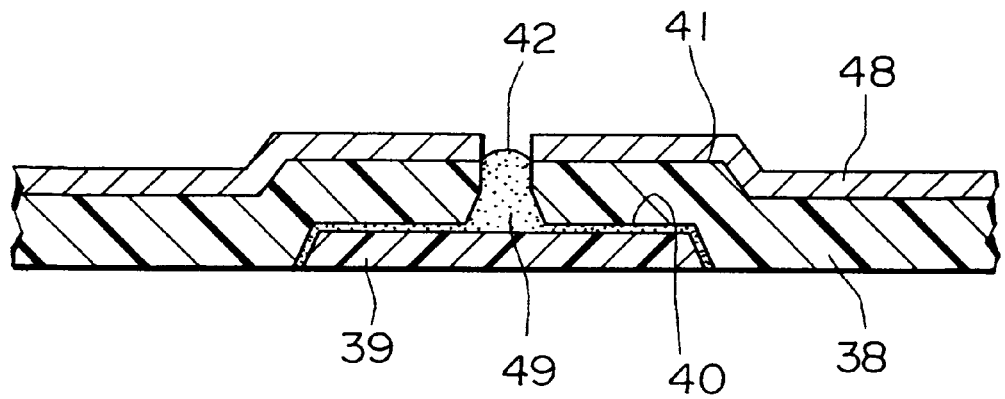
FIG. 3 shows a second example of a thermally insulated double-walled synthetic resin container according to the present invention, and is a section view of the bottom center portion of the outer container.

FIGS. 2 and 3 show a second example of the thermally insulated double-walled synthetic resin container of the present invention; FIG. 2 shows the entire container, and FIG. 3 shows the bottom central portion of the outer container. This thermally insulated synthetic resin container is composed of a container 31 and a lid 51 covering the mouth portion of the container 31.

This container 31 is composed of an outer container 32 and an inner container 33 formed by extrusion molding with a hot-water resistant polycarbonate resin, polypropylene resin, ABS resin, polyester resin or the like, and is a bowl-shaped container having a double-walled structure with a thermal insulator layer 35 at the space portion 34 between the inner and outer containers.

A protrusion portion 41 is formed at the center of the outer container bottom portion 38 on the thermal insulator layer 35 side, and a depression portion 40 aligned with the center of the protrusion portion 41 is formed on the surface by making the bottom wall of the outer container 32 protrude into the thermal insulator layer 35 side. The thickness of the outer container bottom portion 38 with the formation of the protrusion portion 41 and the depression portion 40 is formed so that the thickness of the bottom wall becomes approximately uniform. By making the thickness of the central portion of the outer container bottom portion 38 approximately equal to the thickness at the other portions, the strength of the central portion of the outer container bottom portion 38 can be maintained, especially effective in the case of a container formed from a double-walled container in which the thickness of the inner and outer containers must be made small in comparison to cooler boxes and heat preserving lunchboxes.

The above-mentioned depression portion 40 is for adhesively fitting the sealing panel 39, and the depth of the depression portion 40 is made the same as the thickness of the sealing panel 39, which is formed from the same resin as the inner and outer containers. Due to this type of structure, the bottom portion of the container can be made smooth when the container 31 is assembled, giving it an excellent outward appearance.

At the center of the outer container bottom portion 38, i.e. at the center of the depression portion 40, a hole portion 42 which connects the interior and exterior of the outer container bottom portion 38 is formed. This hole portion 42 is for replacing and sealing with low thermal conductivity gas after the inner and outer containers have been connected to form a double-walled container during the manufacturing process of the container 31. The hole portion 42 is sealed off with adhesives after filling. The diameter of this hole portion 42 should preferably be 0.1~3 mm so that the adhesive will not drip down during the sealing process.

The outer container 32 and the inner container 33 are attached at their respective end portions 36, 37 to form a double-walled container by means of a vibration welding method or a spin welding method. The degree of sealing and the strength of attachment at the portions of attachment of the inner and outer containers are made high because the inner and outer containers are attached by means of vibration welding or spin welding.

The thermal insulator layer formed between the inner container and the outer container is filled with at least one type of low thermal conductivity gas selected from among xenon, krypton and argon. These may be used singly or as mixed gases of two or more types. A container with exceptional thermal insulation capabilities is able to be obtained by using these low thermal conductivity gases.

As shown in FIG. 3, the hole portion 42 of the outer container bottom portion 38 is formed such that the diameter becomes smaller from the bottom surface depression portion 40 side of the outer container 32 towards the protrusion portion 41 side of the thermal insulator space. In this case, the hole diameter on the protrusion portion 41 side is preferably 0.1~3 mm, and more preferably 0.5~2.5 mm; the hole diameter on the depression portion 40 side is preferably 2~5 mm, more preferably 3~4 mm. As will be explained below, the double-walled container is overturned, filled with low thermal conductivity gas, and the hole portion is immediately sealed with adhesives during the manufacturing process for the double-walled container. At that time, if diameter of the hole portion decreases in the direction of the thermal insulator layer, the hole portion 42 acts as a funnel so that even if drops of adhesive are dripped from above, the diameter of the hole portion is wide on the depression portion 40 side, thereby making it easy to catch the drops of adhesive and allowing the hole portion to be easily sealed with adhesive. Additionally, the hole diameter on the protrusion portion side is small at 0.1~3 mm, so that the surface tension of the adhesive works to prevent dripping.

The above-mentioned hole portion 42 is sealed by means of cyano-acrylate type adhesives. These adhesives are highly impenetrable to gases and are able to confer gas barrier properties to the adhesive portion 49. They also offer immediate and powerful adhesive strength, so that they can effectively seal off the low thermal conductivity gas filled into the space portion 34 of the double-walled container.

A sealing panel 39 is fitted and adhered to the depression portion 40 of the outer container 32. That is, after the hole portion 42 is sealed off by adhesives, the sealing panel 39 is coated with cyano-acrylate type adhesives and fitted into the depression portion 40 of the outer container 32, whereby the adhesive portion 49 is protected from external objects. Additionally, since the sealing panel 39 is fitted and adhered to the depression portion 40, the position of the sealing panel 39 is easily decided during manufacture of the double-walled container, so that there are no changes in the position of the sealing panel 39.

A metallic radiation prevention material 48 is provided on the surface of at least the inner container 33 among the rear surfaces of the inner container 33 and the outer container 32 which face the space portion 34; these suppress radiative heat loss from the thermally insulated double-walled synthetic resin container. The radiative heat loss can be made even smaller by providing radiation prevention materials on the inner surface of the outer container as well.

As the radiation prevention material 48, one type selected from among a plating film, aluminum foil, copper foil and silver foil is used. The foils such as aluminum foil, copper foil and silver foil may be attached by means of adhesives or double-sided tape, and are able to be attached cheaply and easily. Additionally, the plating film is formed by electroplating on top of a chemical plating. In addition to reducing the radiative heat loss, the plating film offers the advantage of increasing the gas barrier properties.

The mouth portion of the container 31 formed in this way is covered by a lid 51 which is capable of engaging with an interior portion of the container mouth. The lid 51 is formed from a top wall 52 and a bottom wall 53, with a thermal insulator material 54 formed from styrofoam, urethane, or the like being formed in the space between the top and bottom walls, which are attached so as to have an airtight structure. Additionally, a protrusion portion functioning as a handle 55 is formed on the top wall 53. The heat preserving effect of the container 31 can be increased by covering the container 31 with this type of lid 51.

Next, the method for producing the thermally insulated double-walled synthetic resin container according to the second example of the present invention will be explained with reference to FIGS. 4 and 5.

Figure 4:
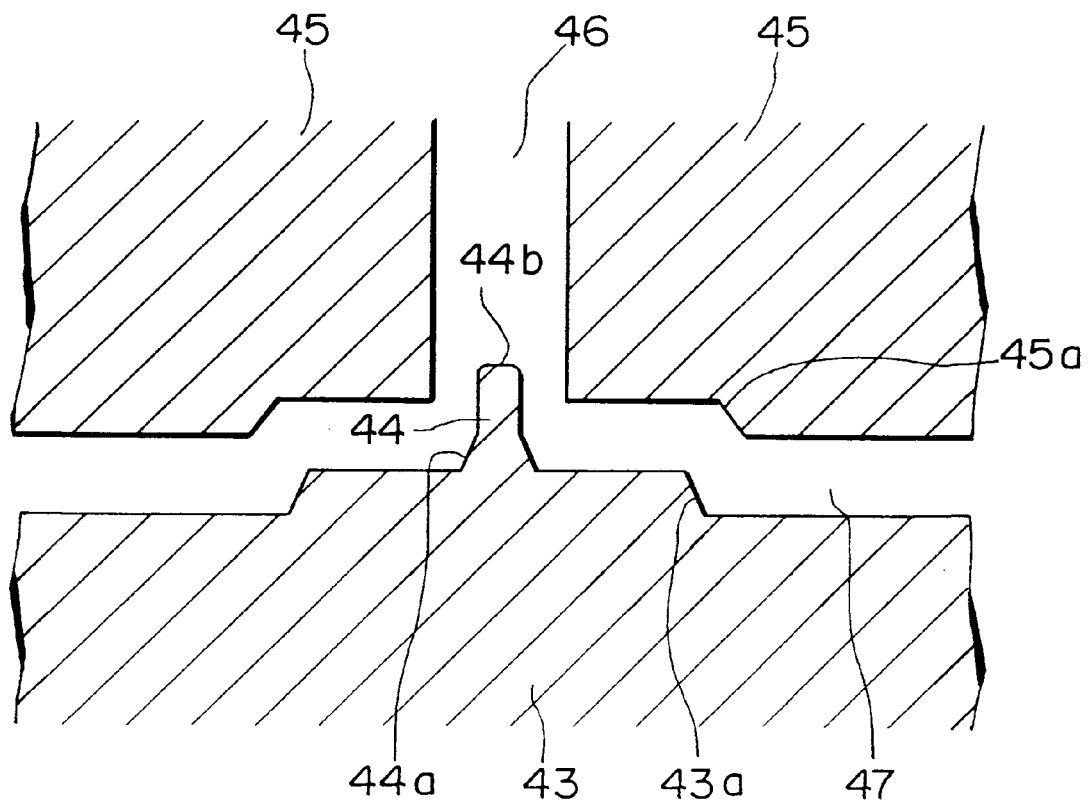
FIG. 4 is a section view showing an example of a manufacturing method for the outer container of the second example of a thermally insulated double-walled synthetic resin container according to the present invention.

FIG. 4 shows a mold for extrusion molding the outer container.

As shown in FIG. 4, a male mold 45 for forming the inner surface of the outer container 32 and a female mold 43 for forming the outer surface of the outer container 32 are used to form a extrusion molding space portion 47 as explained below.

First, a mold depression portion 45a is formed at a corresponding position on the extrusion molding surface of the male mold 45 in order to make the protrusion portion 41 of the outer container 32. Additionally, a mold protrusion portion 43a is formed at a corresponding position on the extrusion molding surface of the female mold 43 in order to make the depression portion 40 of the outer container 32. Also, a hole-opening protrusion portion 44 is formed at the center of the mold protrusion portion 43a of the female mold 43 in order to pass through the bottom wall of the outer container 32 to form a hole portion 42 at the center of the bottom wall. This hole-opening protrusion portion 44 is formed so as to be longer than the thickness of the bottom wall in the vicinity of the hole portion 42 of the outer container 32, and has a diameter which becomes shorter from the base portion 44a to the tip portion 44b.

Additionally, an extrusion molding gate 46 having a diameter larger than the diameter of the hole-opening protrusion portion 44 of the female mold 43 is provided at a central position of the mold depression portion 45a of the male mold 45. The extrusion molding space portion 47 is formed by inserting the tip of the hole-opening protrusion portion 44 of the female mold 43 into this extrusion molding gate 46, and bringing the contact surfaces (not shown in the drawings) of the male mold 45 and the female mold 43 into contact.

The extrusion molding space portion 47 between the male mold 45, the mold depression portion 45a and the mold protrusion portion 43a is for forming the central portion of the outer container bottom portion 38. In order to make the thickness of the entire outer container bottom portion 38 constant, the thickness of the space portion is made uniform.

Figure 5:
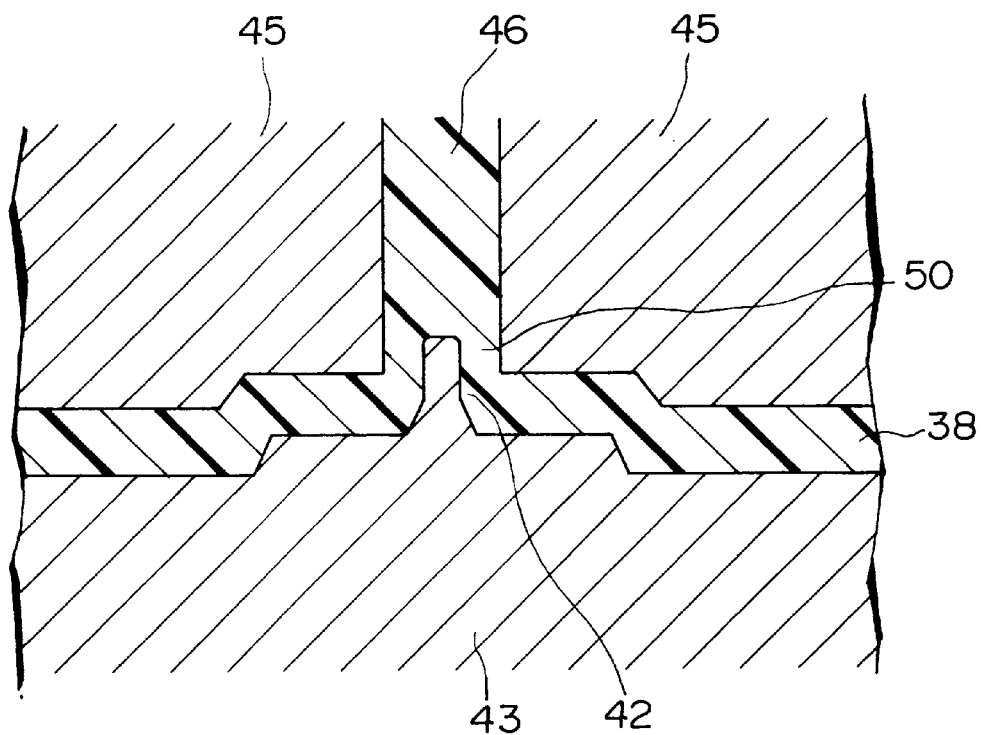
FIG. 5 is a section view showing an example of a manufacturing method for the outer container of the second example of a thermally insulated double-walled synthetic resin container according to the present invention.

Next, as shown in FIG. 5, the outer container 32 is formed by supplying synthetic resin through the extrusion molding gate 46 into the extrusion molding space portion 47. Then, the hole portion 42 is formed on the outer container bottom portion 38 by gate-cutting the gate pin 50 attached to the molded outer container 32 due to the extrusion molding gate 46, thereby completing the outer container 32.

In this way, the outer container molding method described above makes it unnecessary to perform special hole opening procedures in order to form the hole portion.

Additionally, the extrusion molding gate 46 is provided at the central position of the male mold 45 side, i.e. at the central position of the mold depression portion 46 on the extrusion molding surface of the male mold 45, so that when forming an outer container 32 with right/left symmetry, the flow of synthetic resin into the extrusion molding space portion 47 is made even, thereby markedly reducing the occurrence of bad welds, defects in appearance such as decentralization and warping, and insufficient strength.

Furthermore, the gate cutting position is on the inner surface side of the outer container, so that the gate cutting portion cannot be seen from outside when the outer container 32 is assembled with the inner container 33, which is favorable in terms of the outer appearance. Additionally, a protrusion portion 41 is formed on the thermal insulator layer side, so that it is raised above other parts of the outer container bottom portion 38 to allow an easy gate cutting procedure.

On the other hand, there are not especially any problems in molding the inner container 33, as long as the extrusion molding gate is provided at the center of the bottom portion of the outer surface of the inner container 33.

As explained above, a radiation prevention material 48 composed of metal is formed on the inner surface of the outer container 32 and the outer surface of the inner container 33 after the outer container 32 and the inner container 33 are formed. The radiation prevention material 48 is formed either by electroplating on top of a chemical plating by means of copper, silver or the like, or adhering one type of foil selected from among aluminum foil, copper foil and silver foil by means of adhesives or double-sided tape. Then, the double-walled container is formed by attaching the outer container 32 and the inner container 33 by vibration welding or spin welding their respective end portions 36, 37.

Subsequently, this double-walled container is overturned, and after filling the space portion 34 between the inner and outer containers with at least one type of gas selected from among xenon, krypton and argon, the hole portion 42 is sealed off by a cyano-acrylate type adhesive while the double-walled container is still overturned.

As explained above, the hole-opening protrusion portion 44 of the female mold 43 for forming the hole portion 42 of the outer container 32 is shaped so that the diameter becomes smaller from the base portion 44a in the direction of the tip portion 44b, and is provided on top of the mold protrusion portion 43a. Consequently, the hole portion 42 of the outer container 32 has a structure wherein the diameter shortens from the depression portion 40 side of the outer surface in the direction of the protrusion portion 41 side of the inner surface. Therefore, the hole diameter is wide on the depression portion 40 side so that adhesives are easily drawn into the hole portion 42 even if adhesives are dripped into the hole portion 42, and the hole portion sealing procedure is made easy. With regard to the hole portion, when the hole diameter on the protrusion 41 side is 0.1~3 mm, the hole diameter on the depression portion 40 side should preferably be 3~5 mm, and when the hole diameter on the protrusion portion 40 side is 0.1~1 mm, the hole diameter on the depression portion 40 side should preferably be 3~4 mm.

The container 31 obtained in this way has exceptional thermal insulation properties, as well as being excellent with regard to strength and outward appearance.

Figure 6:
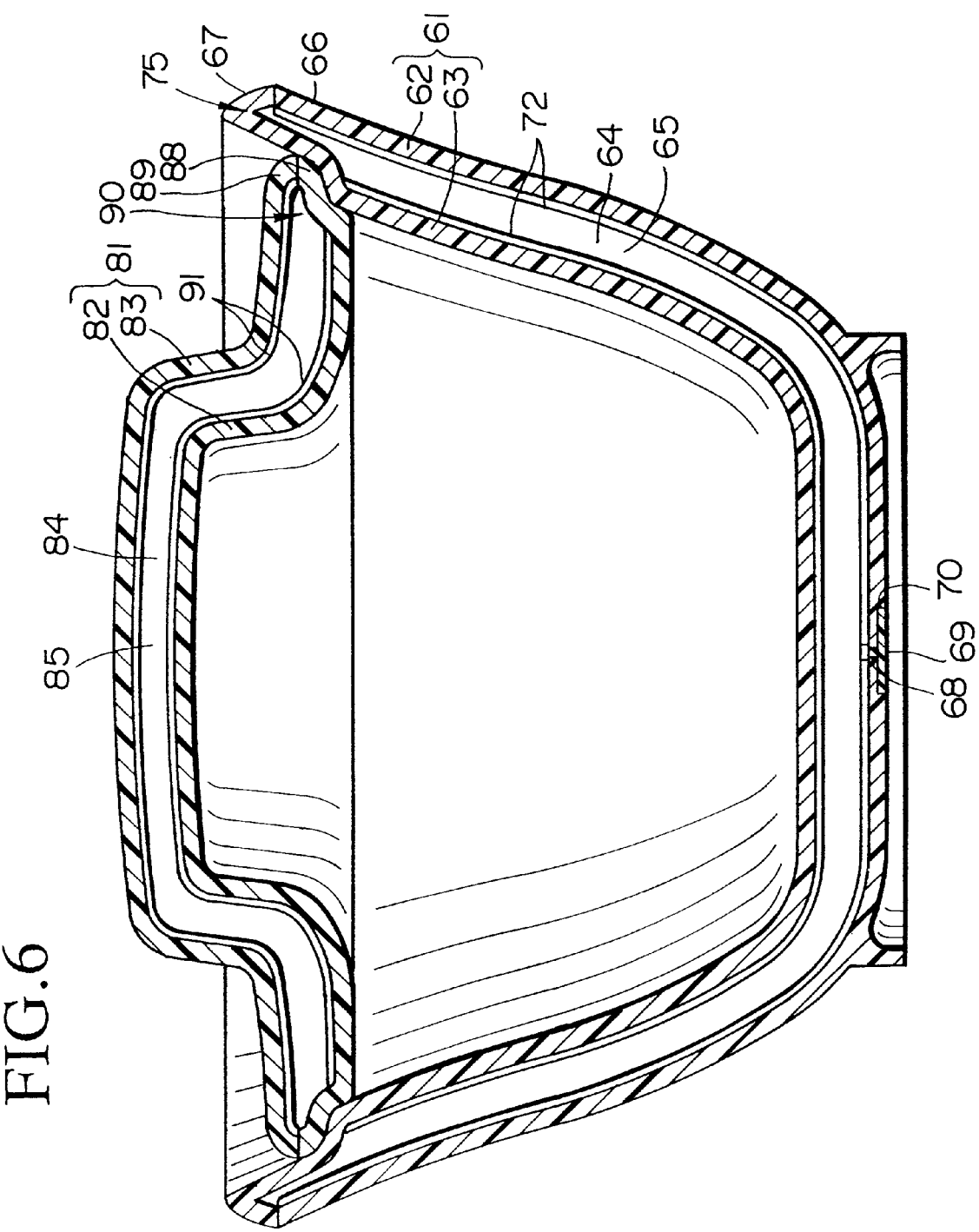
FIG. 6 is a front section view showing an example of a container and a container lid according to a third example of the present invention.

FIG. 6 shows a third example of a container and a lid for the container according to the present invention, wherein reference numeral 61 denotes a container and reference numeral 81 denotes a lid for covering this container 61.

This container 61 is composed of an outer container 62 and an inner container 63, and is in the shape of a bowl with a double-walled structure such that a space portion 64 between the inner and outer containers is filled with low thermal conductivity gas to form a thermal insulator layer 65. The outer container 62 and the inner container 63 are formed by extrusion molding or blow molding with synthetic resins such as hot-water resistant polycarbonate resin, polypropylene resin, ABS resin, polyester resin, and mixed resins of polycarbonate and polyester as the raw material.

As shown in FIGS. 6 and 7, this third example has metallic foil 72 as a metallic film layer formed on the surfaces which face the thermal insulator layer 65, except for the parts a and b near the mouth of the inner container 63. Parts a and b are not provided with metallic foil 72, so that the synthetic resin of the inner and outer containers is exposed. This metallic foil 72 is adhered to the outer surface of the inner container 63 and the inner surface of the outer container 62 by means of adhesives or double-sided tape. The heat loss due to thermal conductivity near the mouth portion 75 is largely reduced because part a, which is the portion contacting the peripheral portion 90 of the lid 81, and part b, which is the area around the inner container end portion 67, do not have metallic foil so that the metallic foil 72 does not come into contact near the mouth portion 75 of the container 61. Additionally, the metallic foil 72 which is formed on most of the surface which faces the thermal insulator layer 65 allows the heat loss due to radiation to be reduced when the container 61 is filled. Since this metallic foil 72 does not require the use of any special apparatus when compared to the formation of a plating film as the metallic film layer, the manufacturing costs of the container 61 can be markedly lowered. The length of part a is approximately 20 mm, and the length of part b is approximately 5 mm.

Additionally, when a metallic foil 72 is provided on the outer surface of the inner container 63, the metallic foil on the area around the mouth portion 75 near part a can be made so as not to maintain complete contact with the surface of the inner container 63, so as to have a slight space between the inner container 63 and the metallic foil 72. This type of structure is able to reduce the heat loss around the mouth portion 75 of the inner container 72.

The outer container end portion 66 and the inner container end portion 67 are connected by means of vibration welding or spin welding to form a space portion 64. When the outer container end portion 66 and the inner container end portion 67 are connected by means of vibration welding or spin welding, these connecting portions can easily and reliably be connected in an airtight fashion, so that the space portion 64 between the inner and outer containers is given an airtight structure and the connective strength is increased.

The low thermal conductivity gas to be filled into the space portion 64 of the container 61 can be selected from the group consisting of xenon, krypton and argon. These gases can be used singly or as a mixture of two or more types, which are filled into the space portion 64 at a pressure of approximately atmospheric pressure. The thermal insulation capabilities of the container 61 can be increased by using these low thermal conductivity gases. Additionally, these low thermal conductivity gases are inert, so that they are preferable for use because they do not present a problem with regard to protection of the environment.

Copper foil or aluminum foil can be used as the metallic foil 72. These metallic foils are able to be obtained cheaply, and are easily attached.

A depression portion 70 which is depressed toward the thermal insulator layer 65 is formed in the bottom center of the outer container 62, and a hole portion 68 is drilled into the central portion of this depression portion 70. This hole portion 68 is sealed by inserting and affixing a sealing panel 69 into this depression portion 70. This sealing panel 69 is affixed to the depression portion 70 in an airtight fashion by means of adhesives. A cyano-acrylate type adhesive is used as the adhesive for sealing the sealing panel 69. This adhesive is extremely airtight after solidification and immediately applies a strong adhesive force, so that the low thermal conductivity gas can be sealed off after filling the space portion of the container 61.

FIG. 8 shows a second example for the arrangement of the metallic film layer on the container 61 illustrated in FIG. 6. As shown in FIG. 8, this example has a structure such that a 1~10 $\mu$m thick copper plating film 73 which is thinner than the metallic foil 72 is formed at parts a and b near the mouth portion of the container 61. The thickness of this copper plating film 73 is not thick enough the influence the heat loss due to thermal conduction through the area around the mouth portion of the inner container 63. This copper plating film 73 provides a gas-barrier property to parts a and b near the mouth portion, and is able to reduce radiative heat loss. This copper plating film 73 is formed by applying a glossy electroplating film onto a foundation which is a chemical plating film. A copper plating film is able to be formed cheaply in comparison to a silver plating film, but is able to obtain the same properties as a silver plating film.

Figure 11:
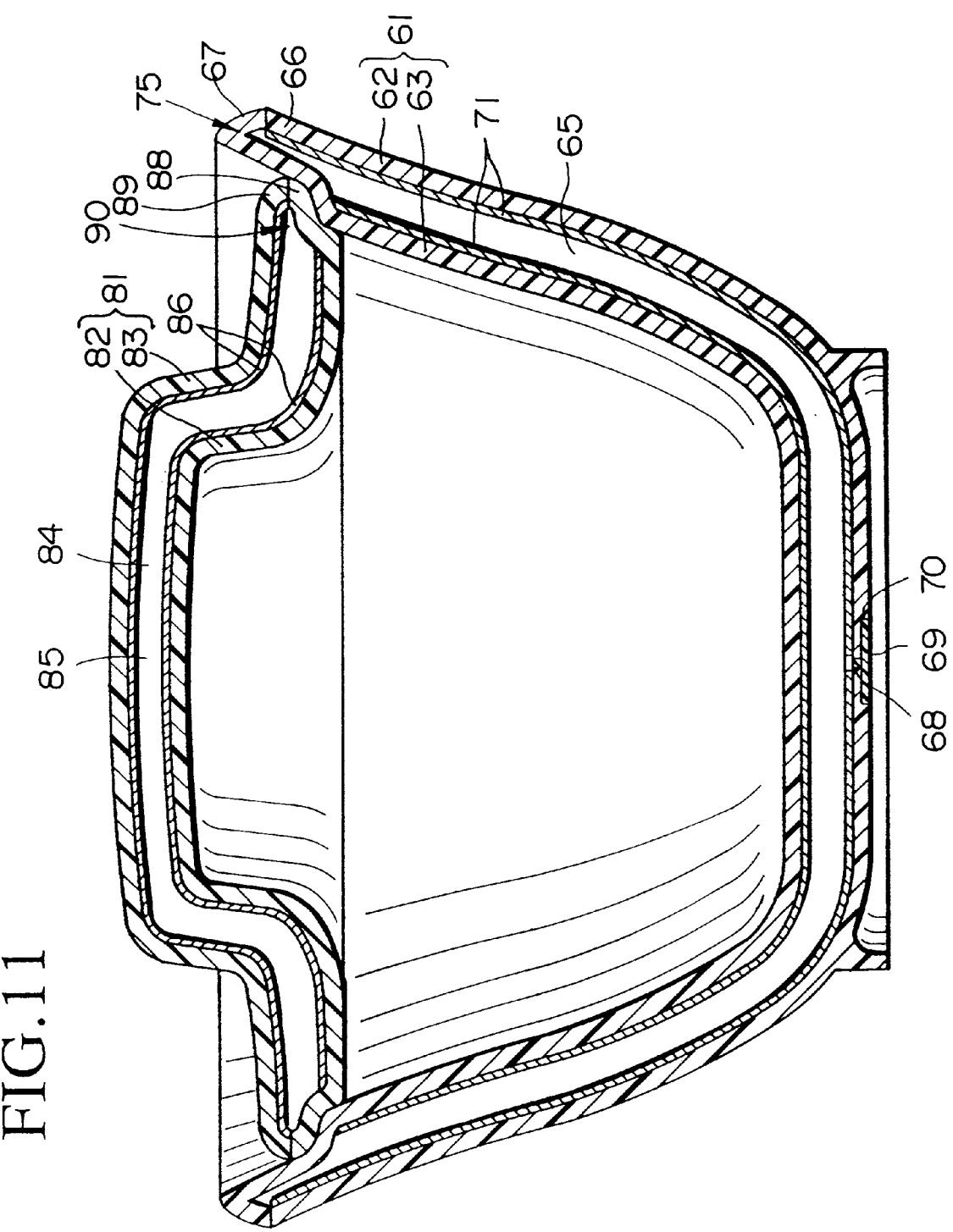
FIG. 11 is a front section view showing a third example for the arrangement of the metallic film layer on the container and lid shown in FIG. 6.

FIGS. 11 and 12 show a third example of the arrangement of a metallic film layer on the container 61 illustrated in FIG. 6. As shown in FIGS. 11 and 12, this example is such that the surfaces which face the thermal insulator layer 65 of the container 61 aside from the parts a and b near the mouth portion are covered with a metallic coating 71 of copper plating film or silver plating film as a metallic film layer for providing gas-barrier properties. Forming this metallic coating 71 allows the gas-barrier properties of the container 61 to be increased, as well as to reduce the heat loss due to radiation. In this case, the heat loss due to thermal conduction from the area around the mouth portion can be reduced because the metallic film 71 is not formed near the mouth portion 75.

FIG. 13 shows a fourth example of the arrangement of a metallic film layer on the container 61 illustrated in FIG. 6. As shown in FIG. 13, this example has a structure such that a 1~10 $\mu$m thick copper plating film 71a which is thinner than the metallic coating 71 formed at parts other than the areas near the mouth portion 75 is formed at parts a and b near the mouth portion of the surfaces which face the thermal insulator layer 65 of the container 61 in order to provide gas-barrier capabilities, and a 10~50 $\mu$m thick metallic coating 71 is formed on the other surfaces which face the thermal insulator layer 65. The lower limit value for the thickness of the copper plating film 71a formed at the surface of parts a and b is made 1 $\mu$m because if the film is less than 1 $\mu$m thick, then the plating can crack under the influence of the heat of the contents during use, as a result of which the gas-barrier property is not able to be obtained. The upper limit value is 10 $\mu$m because if the copper plating film 71a is made thicker than 10 $\mu$m, then there is a large loss due to thermal conduction from the area around the mouth portion. While a metallic coating 71 and a copper plating film 71a are formed so as to cover the entire surface of the container which faces the thermal insulator layer 65, the thickness of the copper plating film 71a near the mouth portion is made thin, so that the heat loss due to thermal conduction from the area around the mouth portion 75 is reduced. This is because the heat loss due to thermal conduction of the metallic film which has a higher thermal conductivity than the synthetic resin depends on the thickness of the copper plating film 71a around the mouth portion 75 of the inner container 63 when the contents are put into the container 61. By making the thickness of the film at parts a and b of the inner container 63 among the surfaces which face the thermal insulator layer 65 thinner than the film at other parts, the heat loss due to thermal conduction from the container 61 is reduced when the contents are put in.

When a copper plating film is used as the metallic coating 71, the portions of the outer surface of the inner container 63 and the inner surface of the outer container 62 aside from the area around the mouth portion 75 of the inner container 63 have a thickness of 10~50 $\mu$m. The lower limit value for the film thickness at parts of the inner container 63 other than the area around the mouth portion 75 is 10 $\mu$m because the plating can be coated uniformly if the film thickness is 10 $\mu$m or more, so as to allow a completely gas-impenetrable plating film to be formed on almost the entire surface of the container 61 facing the thermal insulator layer 65. The upper limit value is 50 $\mu$m because a film thickness of 50 $\mu$m is the limit with regard to the production costs for plating formation even when considering the unevenness of the plating film.

The above-mentioned inner and outer containers 62, 63 should preferably be formed by extrusion molding or blow molding using chemical resistant and hot-water resistant synthetic resins. In this case, chemical resistance refers to the property of being stable with respect to solvent, bleaches and detergents. By forming the inner and outer containers 62, 63 by using chemical resistant and hot-water resistant synthetic resins, damage such as by cracks does not occur to the container 61 even if the container 61 is filled or the container 61 is washed with detergent, so as to allow the strength of the container 61 to be maintained.

The sealing panel 69 which is inserted into the depression portion 70 formed in the bottom center of the outer container 62 of the container 61 and affixed in an airtight fashion by means of adhesives should preferably be formed from a chemical resistant and hot-water resistant synthetic resin as with the inner and outer containers 62, 63. If the sealing panel 69 is formed from a chemical resistant synthetic resin, then even if the hole portion 68 is sealed with the sealing panel 69 using an adhesive after the space portion 64 is filled with low thermal conductivity gas through the hole portion 68, the solvents contained in the adhesives will not cause damage such as cracks to the sealing panel 69. Additionally, bleaches and detergents will also not cause cracks to occur in the sealing panel 69.

For the extrusion molding of the inner container 62 and the outer container 63, a mixed resin of polycarbonate and polyester should preferably be used as the chemical resistant resin. Specifically, a blend of polycarbonate and polyester in a mixing weight ratio of approximately 7:3 is especially desirable. Even if an ABS resin-type coating is applied for plating, the solvents in the coating will not cause cracks (solvent cracks) to occur, since this mixed resin is chemical resistant. Additionally, cracks will almost never form on the inner surface of the inner container 63 or the outer surface of the outer container 62 after the container 61 has been formed, even if it is filled with contents or washed with bleach or detergent. Additionally, this mixed resin is hot-water resistant, and its gas-barrier characteristics are several levels better than polycarbonate resin, polypropylene resin or ABS resin. Consequently, the probability of the low thermal conductivity gas filled into the space portion 64 escaping outside of the container through the container walls is extremely low. For this reason, the gas-barrier capabilities can be made to approach perfection by applying the metallic coating 71 to the inner surface of the outer container 62 and the outer surface of the inner container 63 facing the thermal insulator layer 65. Additionally, if the product lifetime is allowed to be short, then there is no need to form a metallic coating 71 on the surfaces of the inner and outer containers 62, 63 which face the space portion 64 in order to increase the gas-barrier properties, and a container 61 with high thermal insulator capabilities can be obtained by attaching metallic foil 72 to the surfaces of the inner and outer containers 62, 63 which face the thermal insulator layer 65 other than the areas near the mouth portion 75 of the inner container 63. The polyester resin in the mixed resin contains polyethylene terephthalate and polybutylene terephthalate.

The thickness of the space portion 64 between the outer container 62 and the inner container 63 of the container 61 is set to within the range of 1~10 mm. If the thickness is greater than 10 mm, then the heat loss due to thermal convection of the low thermal conductivity gas filling the space portion 64 becomes large, so that the total amount of heat transferred in the thickness direction of the space portion 64 increases, thereby degrading the thermal insulation efficiency, and the effective capacity of the container 61 is lessened due to the space portion 64 becoming thicker. Additionally, if the thickness is less than 1 mm, then it becomes difficult to form the container 61 in a double-walled structure without accidental contact between the outer container 62 and the inner container 63, so that a lot of care is required in production and the production costs rise. The thickness of the space portion 64 can be made thin within the range of 1~10 mm, because the low thermal conductivity gas is sealed into the space portion 64.

Next, the lid of the container according to the present invention shown in FIG. 6 will be explained.

As shown in FIG. 6, the lid 81 for covering the container 61 is formed from a bottom wall 82 and a top wall 83, and has a double-wall structured cap shape having a thermal insulator layer 85 wherein low thermal conductivity gas is sealed into the space portion 84 between these top and bottom walls. Then, a protrusion portion 91 on the top wall 83 becomes the handle of the lid 81. These top and bottom walls 82, 83 are formed by extrusion molding or blow molding synthetic resins such as hot-water resistant polycarbonate resin, polypropylene resin, ABS resin, polyester resin, and mixed resins of polycarbonate and polyester.

Figure 9:
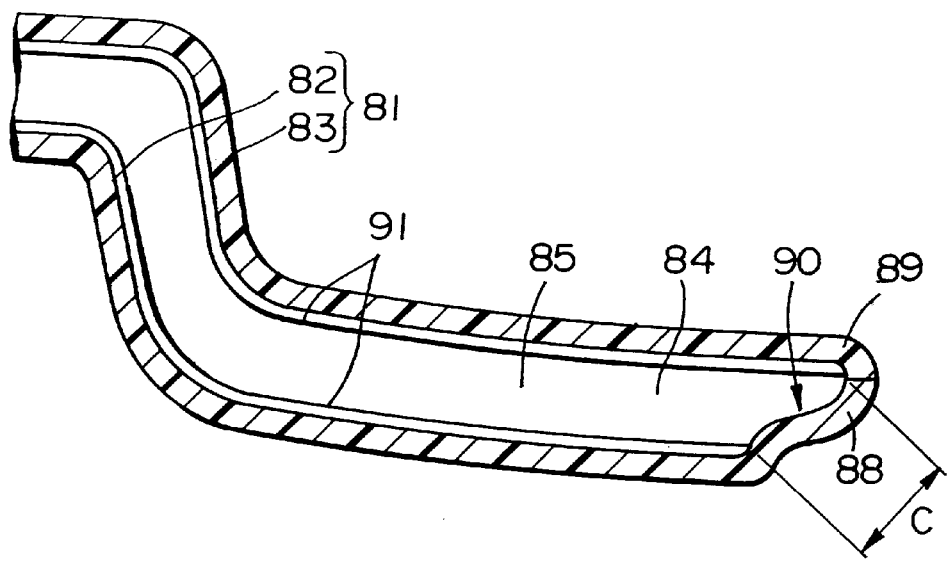
FIG. 9 is a portional section view showing a first example for the arrangement of the metallic film layer on the lid shown in FIG. 6.

As shown in FIGS. 6 and 9, a metallic foil 91 is formed as a metallic film layer on the portions of the surfaces which face the thermal insulator layer 85 of the lid 81 except for the parts c near the peripheral portion 90. This metallic foil 91 is adhered to the inner surface of the top wall 83 and the outer surface of the bottom wall 82 by means of adhesives or double-sided tape. As a result, no metallic foil 91 is formed on the part c which contacts the container 1, so that there is no contact between the metallic foil 91 near the peripheral portion 90 of the lid 81, thereby markedly reducing the heat loss due to thermal conduction from the bottom surface peripheral portion 90 of the lid 81. Additionally, since metallic foil 91 is formed on most of the surfaces which face the thermal insulator layer 85, the heat loss due to radiation leaks can be reduced.

The bottom wall end portion 88 and the top wall end portion 89 are attached by means of vibration welding or spin welding, thereby forming the space portion 84.

As a low thermal conductivity gas for filling the space portion 84 of the lid 81, at least one type of gas is selected from the group consisting of xenon, krypton and argon, similar to the low thermal conductivity gas in the container 61.

Figure 10:
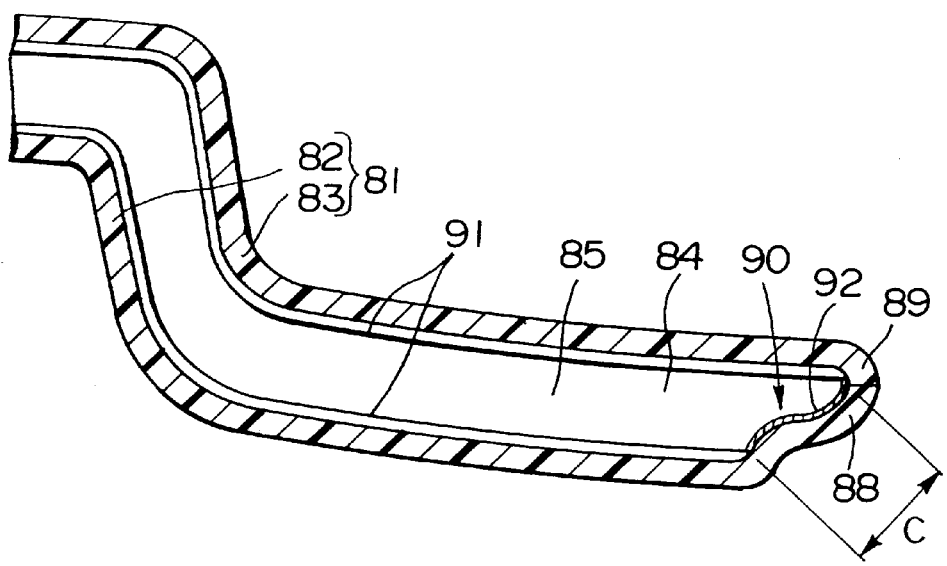
FIG. 10 is a portional section view showing a second example for the arrangement of the metallic film layer on the lid shown in FIG. 6.

FIG. 10 shows a second example for the arrangement of the metallic film layer in the lid 81 illustrated in FIG. 6. As shown in FIG. 10, this example has a 1~10 $\mu$m thick copper plating film 92 thinner than the metallic foil 91 formed in the area around the peripheral portion 90 of the lid 80. The thickness of this copper plating film 92 is not enough to influence the heat loss due to thermal conduction from the area around the peripheral portion 90 of the bottom wall 82, so that part c in the area around the peripheral portion 90 of the copper plating film 92 is given a gas-barrier property while also reducing the heat loss due to radiation.

As this metallic film 91, a copper foil or an aluminum foil is used. These metallic foils are cheaply available, and are easily attached.

Figure 14:
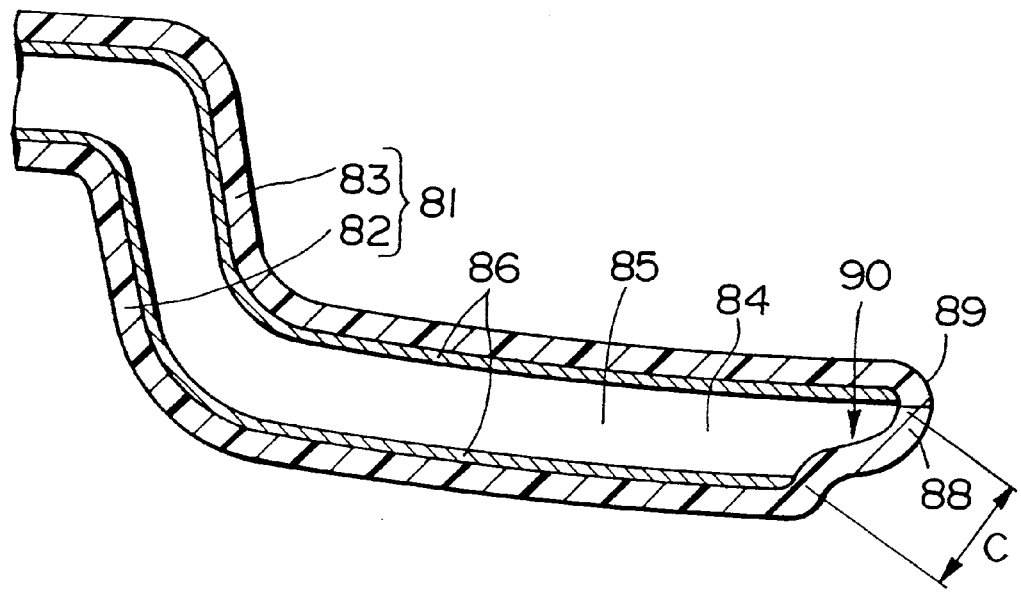
FIG. 14 is a portional section view showing a third example for the arrangement of the metallic film layer on the lid shown in FIG. 6.

FIGS. 11 and 14 show a third example for the arrangement of the metallic film layer on the lid 81 illustrated in FIG. 6. As shown in FIGS. 11 and 14, this example has a metallic film 86 such as a copper plating film or a silver plating film as a metallic film layer formed on the surfaces which face the thermal insulator layer 85 of the lid 81 except for part c around the peripheral portion 90 in order to give a gas-barrier property, while the synthetic resin at part c is exposed. By forming this metallic film 86, the gas-barrier property of the lid 81 can be increased while reducing the heat loss due to radiation. In this case, no metallic film layer is formed on part c around the peripheral portion 90, so that the heat loss due to thermal conduction from the peripheral portion 90 can be reduced.

Figure 15:
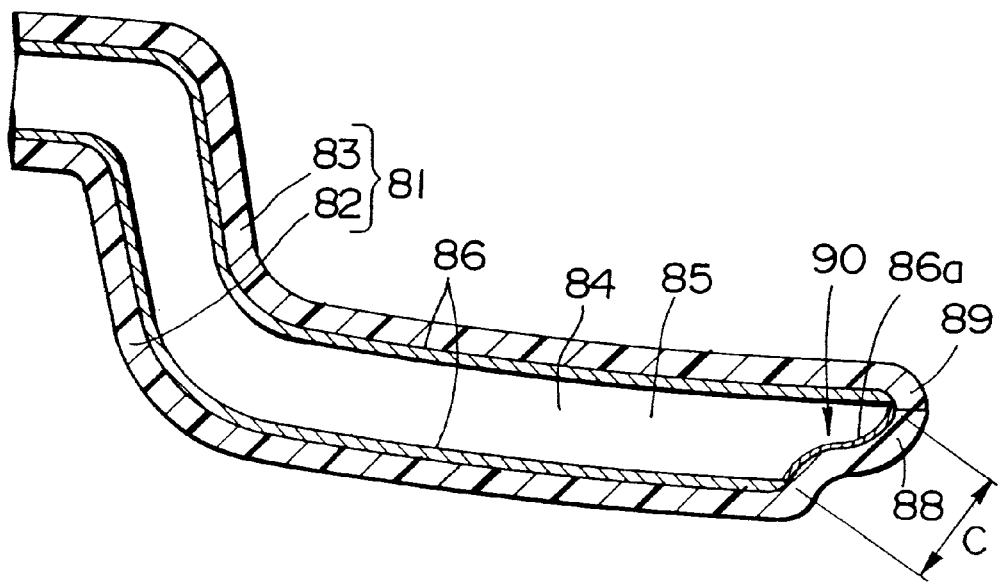
FIG. 15 is a portional section view showing a fourth example for the arrangement of the metallic film layer on the lid shown in FIG. 6.

FIG. 15 shows a fourth example for the arrangement of the metallic film layer on the lid 81 illustrated in FIG. 6. As shown in FIG. 15, this example has a 1~10 $\mu$m thick copper plating film 86a thinner than the metallic foil 86, the metallic film layer in the area around the peripheral portion 90 of the surfaces which face the thermal insulator layer 85, formed on part c in the area around the peripheral portion 90 of the surfaces which face the thermal insulator layer 85 of the lid 81 in order to provide gas-barrier properties. The lower limit value for the thickness of this copper plating film 86a is 1 $\mu$m because if the thickness is less than 1 $\mu$m, then cracks can form in the plating under the influence of heat from the contents during use, as a result of which the gas-barrier property will be lost. The upper limit value is 10 $\mu$m because if the thickness of the copper plating film 86a is greater than 10 $\mu$m, then the heat loss due to thermal conduction from the area around the peripheral portion 90 becomes large. While the structure shown in FIG. 15 has a metallic film 86 and a copper plating film 86a covering the entire surface which faces the thermal insulator layer 85 of the lid 81, the heat loss due thermal conduction from the area around the peripheral portion 90 is held low because the film is thin around the peripheral portion 90. This is because the heat loss due to thermal conduction from the metallic film 86, which has a higher thermal conductivity than the synthetic resin, depends upon the thickness of the copper plating film 86a around the peripheral portion 90 of the lid 81, so that the heat loss due to thermal conduction from the lid 81 can be made smaller by forming the film at part c around the peripheral portion 90 of the surfaces facing the thermal insulator layer 85 thinner than the thickness at other parts.

A hole portion, not shown in the drawings, which connects to the space portion 84 is provided on the lid 81, and this hole portion is sealed in airtight fashion by means of a sealing panel which is not shown in the drawings. This sealing panel is attached and affixed after low thermal conductivity gas has been introduced into the space portion 84 through the hole portion, by adhering the sealing panel by means of a cyano-acrylate type adhesive to seal off the hole portion. Additionally, the bottom wall 82 and the top wall 83 of this lid 81 can be formed from a chemical resistant and hot-water resistant synthetic resin as with container 61, such as a mixed resin of polycarbonate and polyester. By forming the lid 81 from a chemical resistant synthetic resin material, cracks (solvent cracks) due to solvents in the coating will not form even if an ABS resin type coating is applied for plating. Additionally, after the lid 81 is formed, contents can be put in and bleaches or detergents can be used for washing without causing cracks to form on the inner surface of the bottom wall 82 or the outer surface of the top wall 83. Furthermore, this mixed resin is hot-water resistant, and offers gas-barrier capabilities which are superior to polycarbonate resin, polypropylene resin and ABS resin. Therefore, the probability of the low thermal conductivity gas filled into the space portion 84 escaping by means of permeation through the container walls is extremely slight.

Consequently, the gas-barrier property can be made almost perfect by applying a metallic film 86 on the outer surface of the bottom wall 82 or the inner surface of the top wall 83 which face the thermal insulator layer 85. Additionally, if the product lifetime is allowed to be short, then there is no need to form a plating film on the surfaces which face the space portion 84 between the top and bottom walls 82, 83 in order to increase the gas-barrier capabilities, so that a lid 81 with excellent thermal insulation performance can be obtained by adhering a metallic foil 91 to the surfaces which face the thermal insulator layer 85 of the top and bottom walls 82, 83 aside from the peripheral portion 90 of the bottom wall 82.

The thickness of the space portion 84 between the top wall 82 and the bottom wall 83 of the lid 81 is set to within the range of 1~10 mm. If this thickness is greater than 10 mm, then when the lid 81 is formed, the heat loss due to convective thermal conduction of the low thermal conductivity gas inside the space portion 84 becomes large, so that the total thermal conduction in the thickness direction of the space portion 84 increases and the thermal insulation efficiency becomes worse. Additionally, the space portion 84 becomes so thick that the lid 81 is made undesirably bulky. If this thickness is less than 1 mm, then it becomes difficult to form the lid 81 into a double-walled structure while avoiding contact between the top wall 82 and the bottom wall 83, so that undue care is required during manufacture and the manufacturing costs rise. The thickness of the space portion 84 can be made as thin as 1~10 mm largely because the space portion 84 is filled with a low thermal conductivity gas.

Figure 16:
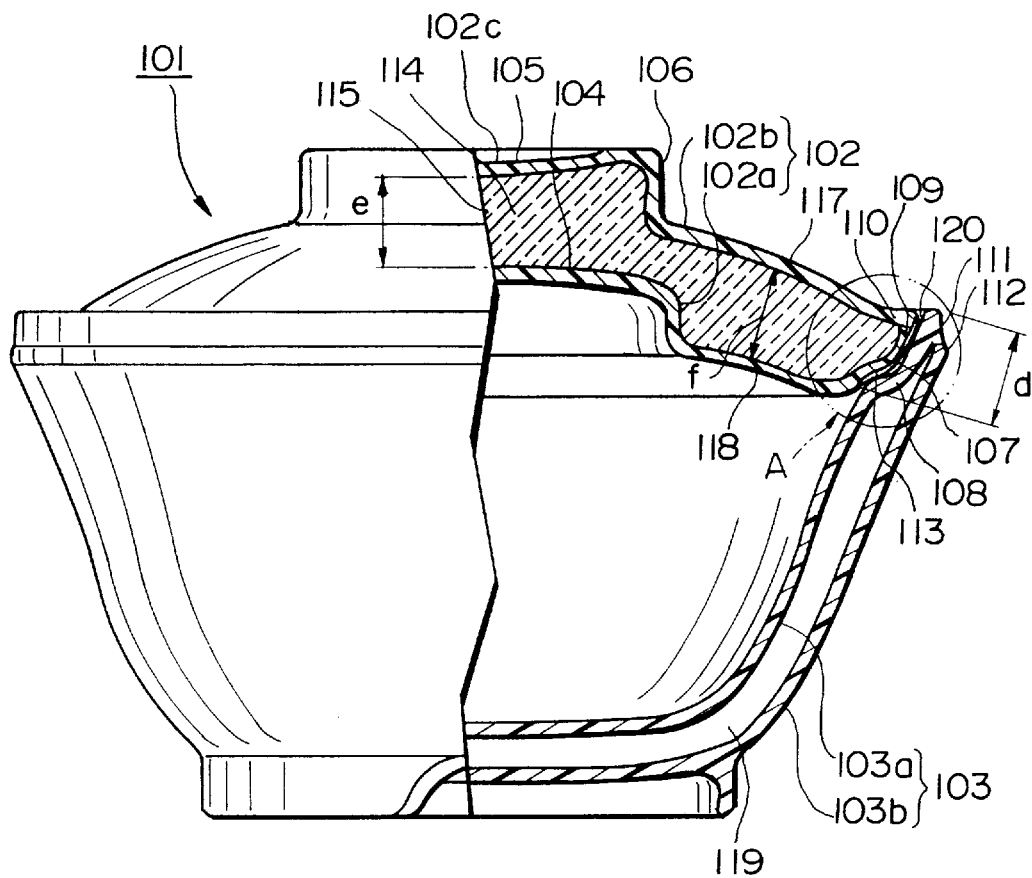
FIG. 16 is a section view showing an example of a lid for a container according to the present invention.

Hereinbelow, other embodiments of the lid for the container of the present invention will be explained with reference to FIGS. 16 through 20. As shown in FIG. 16, reference numeral 101 denotes a container having a lid, which is composed of a container 103 and a lid 102.

The container 103 is composed of an inner container 103a and an outer container 103b molded from hot-water resistant polycarbonate resin, polypropylene resin, ABS resin or polyester resin. After the inner container end portion 111 and the outer container end portion 112 are attached by means of vibration welding or spin welding, the space portion 119 formed between the inner and outer containers is filled with at least one type of gas chosen from among xenon, krypton and argon through a hole portion (not shown in the drawings) formed in the outer container 103b, then the hole portion is sealed off by means of a sealing panel to which a cyano-acrylate type adhesive has been applied. The container 103 is bowl-shaped, and a mouth circumferential wall portion 108 which engages with the peripheral portion 107 of the lid 102 is formed in the area around the mouth portion 120 of the container 103.

The lid 102 of this container 101 has a bottom wall 102a and a top wall 102b, and the top and bottom walls are formed from hot-water resistant polycarbonate resin, polypropylene resin, ABS resin or polyester resin, similar to that used for the container 103. The top wall 102b has a cylindrical top wall protrusion portion 105 which protrudes upwards formed at the central portion, while the bottom wall 102a has a cylindrical bottom wall protrusion portion 104 which protrudes upwards formed at the central portion so as to be supported in the space portion 115. Additionally, the inner diameter of the bottom wall protrusion portion 104 is slightly larger than the outer diameter of the top wall protrusion portion 105. Furthermore, the height of the bottom wall protrusion portion 104, without considering the thickness of the bottom wall, is made approximately equal to the height of the top wall protrusion portion 105.

The lid 102 is obtained by attaching the bottom wall end portion 109 and the top wall end portion 110 by means of vibration welding or spin welding in an airtight structure. As a result, when lids 102 of this type are stacked on top of each other, the top wall protrusion portion 104 of the bottom lids can be inserted into the cylindrical space formed by the bottom surface protrusion portions on the lids thereabove.

In this case, a top wall abdominal portion 117 having a gradual downward slope from the base of the top wall protrusion portion 110 is formed on the top wall 102b. Additionally, a bottom wall abdominal portion 117 having a gradual downward slope from the base of the bottom wall protrusion portion 104 is formed on the bottom wall 102a. The downward slope of this bottom wall abdominal portion 118 is formed so as to approximately match the downward slope of the top wall abdominal portion 117.

Consequently, the bottom wall abdominal portions 118 of the upper lids easily fit with the top wall abdominal portions 117 of the bottom lids when the lids are stacked.

Alternatively, the bottom wall abdominal portion 118 can be made to bulge downward without matching the downward slopes of the bottom wall abdominal portion 118 and the top wall abdominal portion 117. In this case, the bottom wall abdominal portion 118 is made to bulge uniformly over the circumferential direction, so that the lids 102 sit well when they are stacked.

On the other hand, the circumferential wall portion 107 of the bottom wall 102a is shaped with an upward curve, so that the bottom wall end portion 109 of the circumferential portion 107 is able to connect with the top wall end portion 110 of the top wall 102b. As a result, a space portion 115 is formed when the bottom wall 102a and the top wall 102b are connected at their respective end portion 109, 110. In this case, the space portion 115 is filled with air, so as to obtain an air-insulated lid 102.

The circumferential wall portion 107 of the bottom wall 102a is shaped so as to contact the surface of the mouth inner circumference wall portion 108 of the container 103. As a result, the circumferential wall portion 107 and the mouth inner circumference wall portion 108 achieve contact at their surfaces, so that the conductive distance between the exterior and interior of the container 101 becomes large, thereby allowing the thermal insulation effect of the lid 102 to be increased and making it difficult for the heat from food to escape from the container 103. Additionally, they are engaged by contact at their surfaces, so that the setting of the lid onto the container body is improved, thereby producing a clicking sensation during application and improving the stability for transport.

The width of the contact surface, that is, the width d shown in FIG. 16, is at least 5 mm. This is because the effect of increasing the thermal insulation capabilities is not sufficient when the width d is less than 5 mm.

Figure 17:
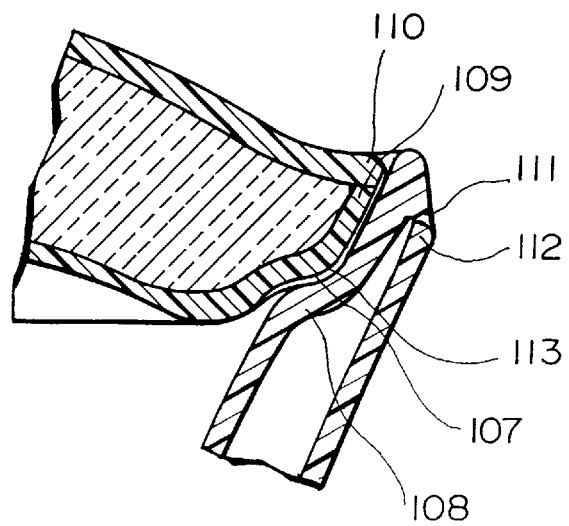
FIG. 17 is a portional enlarged view of the lid of the container shown in FIG. 16.

FIG. 17 is an enlarged view of part A in FIG. 16. As shown in FIG. 17, a notch 113 is formed in the radial direction of the circumferential wall portion 107 of the lid 102. This notch 113 is formed so as to allow communication between the interior and exterior of the container 101 from the top wall end portion 110 to the circumferential wall portion 107. It is sufficient that this notch be a semi-circle wherein the cross-sectional diameter which orthogonally intersects the longitudinal direction of the notch is approximately 3 mm, and the heat from food put into the container 101 will not easily escape due to the formation of this notch 113. Consequently, the lid 102 can always be removed from the container 103 without the lid 102 sticking and becoming difficult to remove, even if hot food is put into the container 103 and covered with the lid 102, then left until the temperature of the food drops.

Additionally, the cross-sectional shape of the notch 113 is arbitrary.

The thickness of the lid formed by the bottom wall 102a and the top wall 102b, that is, the thicknesses e and of shown in FIG. 16 are 10~15 mm. In this case, the area around the circumferential wall portion 107 and the space portion between the portions at which the top wall protrusion portion 105 and the bottom wall protrusion portion 104 rise are made thinner than other portions. However, since the thickness of almost all of the portions of the lid 102 can be made 10~15 mm, the thermal insulation space of the lid 102 can be made large so as to improve the thermal insulation capabilities without degrading the outward appearance.

If these thicknesses e and of are less than 10 mm, then the effect of increasing the thermal insulation capabilities is not sufficient. Additionally, if these thicknesses e and of are made greater than 15 mm, then the storage capacity of the container 101 becomes smaller than is preferable.

Figure 18:
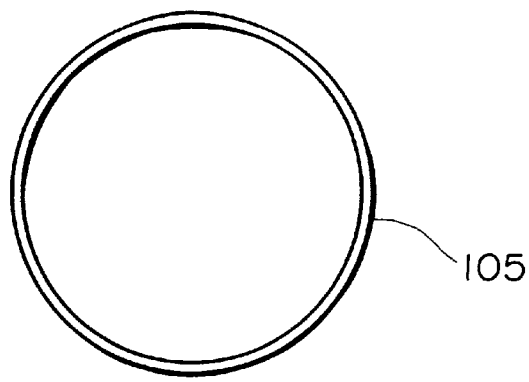
FIG. 18 is a section view showing a top wall protruding portion of the lid of the container shown in FIG. 16.
Figure 19:
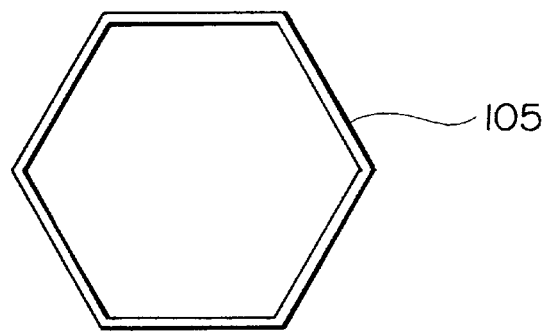
FIG. 19 is a section view showing another example of a top wall protruding portion of the lid of the container shown in FIG. 16.

The shape of the top wall protrusion portion 105 as the handle portion 106 of the lid 102 is made into a cylinder or a polygonal cylinder. By making the top wall protrusion portion 105 of the lid 102 into a cylindrical shape as shown in FIG. 18, the thickness of the lid 102 can be made larger by forming a canopy portion 102c on the top wall protrusion portion 105. If the top wall protrusion portion 105 of the lid 102 is formed into a cylindrical shape, then the inner diameter of the bottom wall protrusion portion 104 must be made slightly greater than the outer diameter of the top wall protrusion portion 105. As shown in FIG. 19, the thickness of the lid can be made greater by forming a canopy portion in the case wherein the top wall protrusion portion of the lid 102 is a polygonal cylinder as well. In this case, the shape of the bottom wall protrusion portion can be formed slightly larger with the same shape as the top wall protrusion portion so as to allow the bottom wall protrusion portions to be stored in the top wall protrusion portions when the lids are to be stacked; however, the bottom wall protrusion portion 104 should preferably have a cylindrical shape with an inner diameter larger than the diameter of a circle circumscribing the top wall protrusion portion so that the top wall protrusion portion can be stored in the cylindrical space of the bottom wall protrusion portion at any position along the circumferential direction of the lids.

The designability of the lid can be increased by giving the top wall protrusion portion a cylindrical or polygonal cylindrical shape in this way.

The space portion 115 of the lid 102 can be made into a thermal insulation layer 114 by filling with a thermal insulator material selected from among styrofoam, urethane and pearlite powder. Their respective thermal conductivities are styrofoam ($\kappa=3.50\times10^{-2}$ W·m$^{-1}$·K$^{-1}$; 0° C.), urethane ($\kappa=1.75\times10^{-2}$ W·m$^{-1}$·K$^{-1}$; 0° C.) and pearlite powder ($\kappa=10.3\times10^{-2}$ W·m$^{-1}$·K$^{-1}$; 0° C.), they are lightweight, and the thermal insulation capabilities can be increased by suppressing thermal conductance due to convection currents in the space portion 115 by filling with these filler materials. The styrofoam and urethane are filled by molding into a shape somewhat smaller than the space portion 115. When styrofoam or urethane is used, the lid 102 is obtained by placing the thermal insulator material onto the bottom wall 102a or the top wall 102b, then stacking the top wall 102b or bottom wall 102a thereon, and connecting the end portions of the top and bottom walls by means of a vibration welding method or a spin welding method in an airtight fashion. The pearlite powder is filled into the lid 102 after the end portions of the top and bottom walls have been connected by means of a vibration welding method or a spin welding method in an airtight fashion, by filling through a filling hole (not shown in the drawings) and sealing with a sealing panel (not shown in the drawings). Since styrofoam, urethane and pearlite powder are cheap, the lid 102 can be cheaply made.

Figure 20:
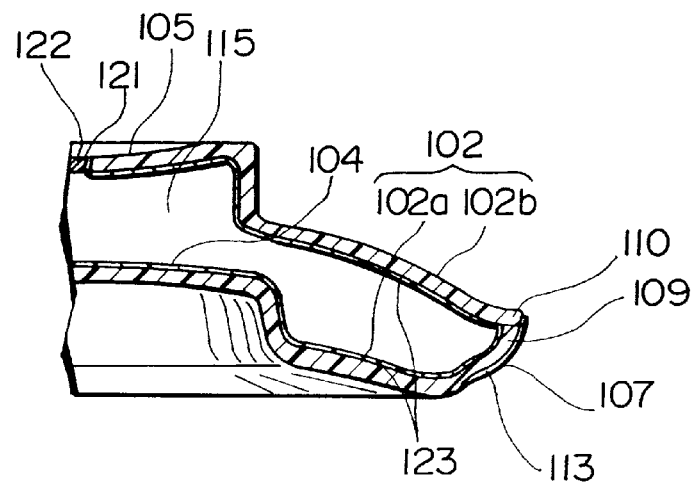
FIG. 20 is a section view showing another example of a lid for a container according to the present invention.

The space portion 115 of the lid 102 can also be filled with at least one type of low thermal conductivity gas selected from among xenon, krypton and argon. These can be used either singly or as mixed gases of two or more. The lid 102 can be given high thermal insulation capabilities by using these low thermal conductivity gases, so as to approach the thermal insulation capabilities of the container 103. Furthermore, since they are inert, their use is not a problem in terms of environmental protection and are highly suitable for use. These gases are filled through a hole portion 121 as shown in FIG. 20, then sealed by means of a sealing panel 122 of the same material as the inner and outer walls of the lid using a cyano-acrylate type adhesive.

When the space portion 115 is filled with a low thermal conductivity gas such as xenon, krypton or argon, the thickness of the lid e and of can be made 5~10 mm.

If the space portion 115 is filled with a low thermal conductivity gas, it becomes lighter than thermal insulator materials such as styrofoam, urethane and pearlite powder, and the resulting lid 102 will not feel heavier. Additionally, in this case, the gas-barrier capabilities of the top and bottom wall of the lid will not be degraded to allow leaks of the filled gas, since the top wall 102b and the bottom wall 102a of the lid 102 are molded from chemical resistant and hot-water resistant mixed resins wherein polycarbonate and polyester are blended at a ratio of 7:3.

Additionally, a radiation prevention material 123 composed of a metal is formed on at least the surface of the bottom wall among the surfaces of the top and bottom wall forming the lid which face the space portion 115. This allows radiative thermal leakage from the lid 102 to be suppressed. Additionally, the radiative thermal leakage can be markedly reduced by forming radiation prevention materials 123 composed of metals on the top wall 102b as well as the bottom wall 102a.

Furthermore, as the metal composing the radiation prevention material 123, it is possible to select one from among plating film, aluminum foil, copper foil and silver foil. A plating film can be applied by electroplating on top of a chemical plating. If the radiation prevention material 123 is made a plating film, then the gas-barrier property can be improved in addition to reducing the radiative thermal loss. Foils such as aluminum foil can be attached to the surfaces of the top and bottom walls forming the lid which face the space portion by means of adhesives or double-sided tape. As a result, the radiation prevention materials 123 can be attached cheaply and easily.

Figure 21:
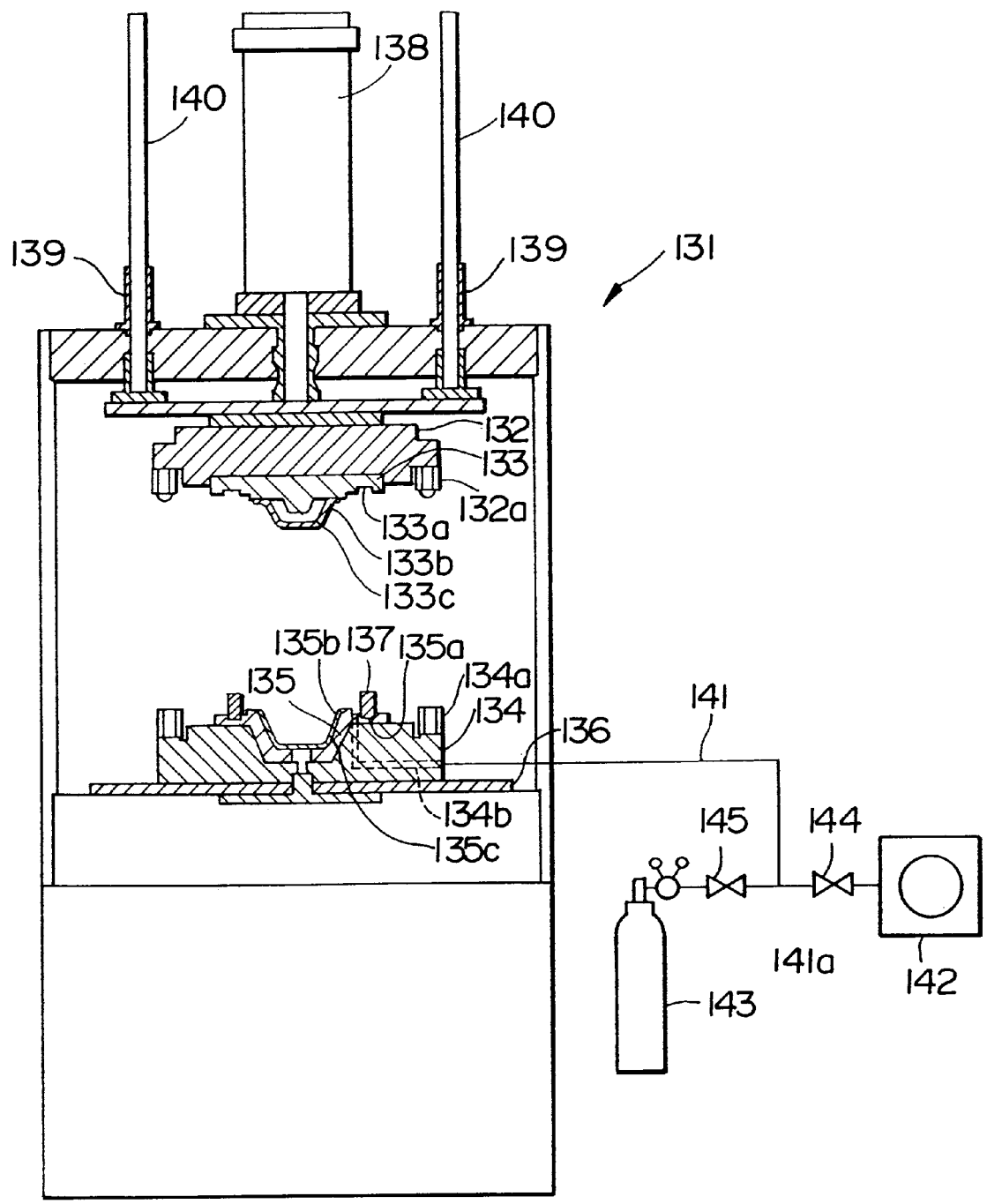
FIG. 21 is a front section view showing a vibration welder suitable for carrying out the manufacturing method for a thermally insulated double-walled synthetic resin container according to the present invention.

FIG. 21 illustrates a vibration welder as an example of a manufacturing apparatus suitable for carrying out the manufacturing method for the thermally insulated double-walled synthetic resin container of the present invention. This vibration welder 131 has a lower support stand 134 and an upper support stand 132; the lower support stand 134 is anchored to a base 136. The upper support stand 132 moves up and down by means of the driving force of an air cylinder 138. This upper support stand 132 is made so as not to be able to rotate horizontally due to two guide rods 140, 140 connected to the upper support stand 132 which move up and down along guides 139. When the upper support stand 132 is lowered, convex portions of upper positioning blocks 132a, 132a at both ends of the upper support stand 132 engage with concave portions of lower positioning blocks 134a, 134a on the lower support stand so as to allow the upper support stand 132 to be positioned onto the lower support stand 134.

A lower jig 135 is affixed to the lower support stand 134, and an upper jig 133 is affixed to the upper support stand 132. The lower jig 135 and the upper jig 133 should preferably be unitarily molded from metals such as aluminum. A concave portion 135c is formed in the lower jig 135, and a lower work member 135b which supports almost the entire outer surface of the outer container 151 of the double-walled container is attached to this concave portion 135c. On the other hand, a convex portion 133c is formed on the upper jig 133, and an upper work member 133b which supports almost the entire inner surface of the inner container 152 of the double-walled container is formed on this convex portion 133c. The lower work member 135b and the upper work member 133b are formed from flexible urethane rubber or the like, and are respectively affixed to the lower jig 135 and the upper jig 133 by means of adhesives or the like. Therefore, the lower work member 135b and the upper work member 133b are exchanged along with the lower jig 135 and the upper jig 133. The center of the convex portion 133c of the upper jig 133 affixed to the upper support stand 132 moves vertically along the axis connecting it with the center of the concave portion 135c of the lower jib 135 by means of the driving force of the air cylinder 138.

Figure 22:
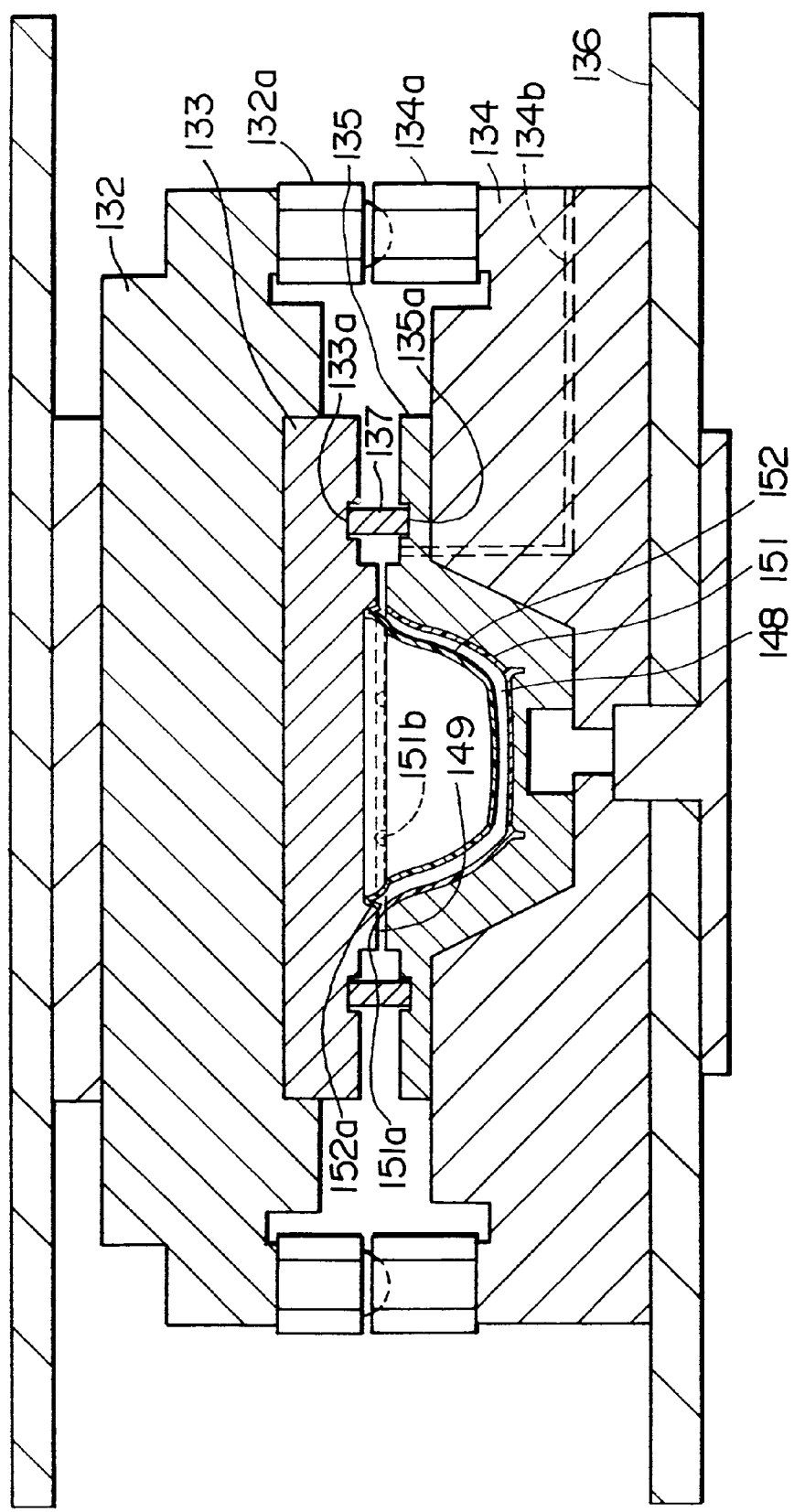
FIG. 22 is a portional section view showing the apparatus of FIG. 21 during manufacturing.
Figure 23:
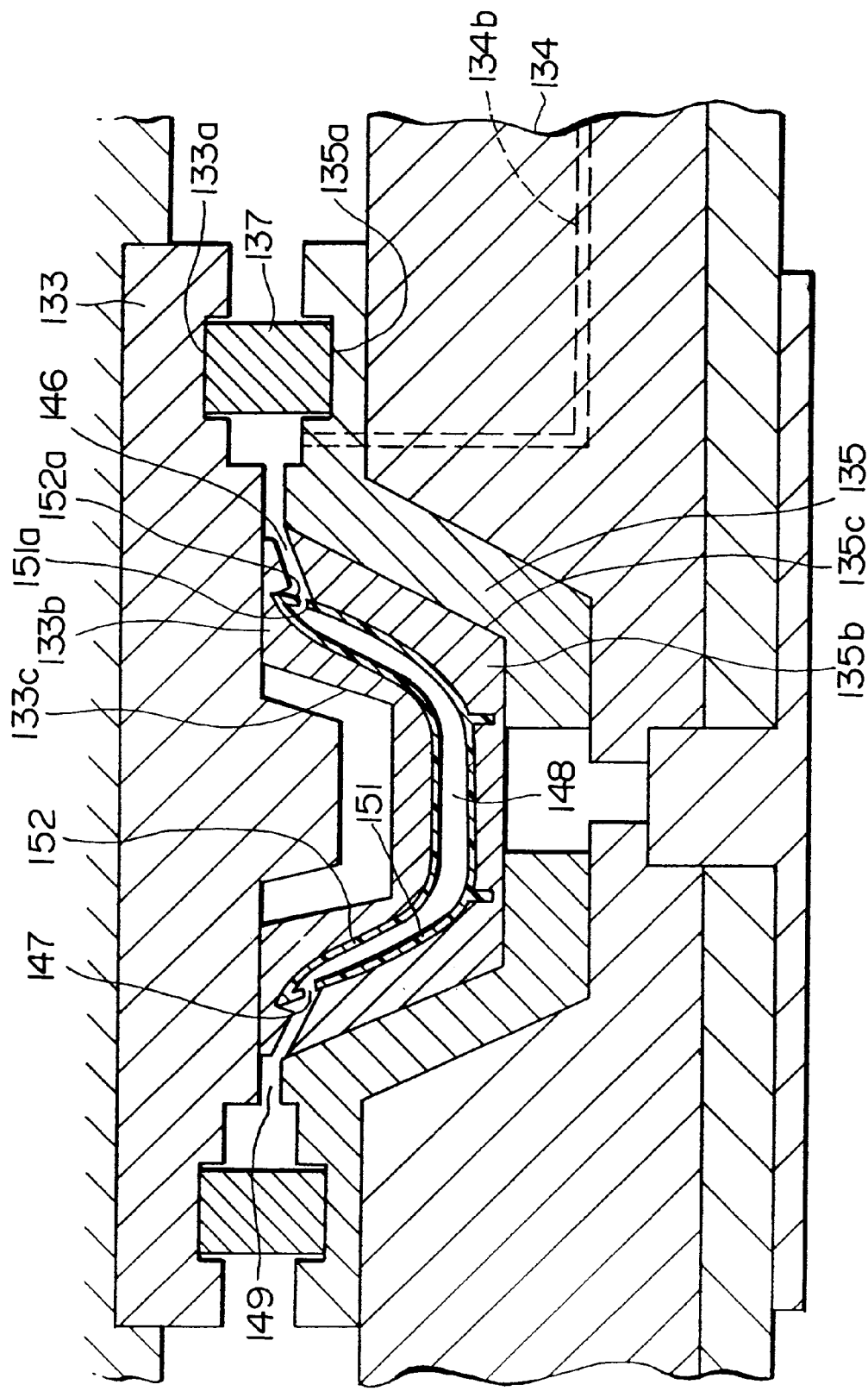
FIG. 23 is a portional section view of the apparatus of FIG. 21.

FIGS. 22 and 23 illustrate the state wherein the lower jig 135 and the upper jig 133 have been attached to the vibration welder 131, and the synthetic resin inner container 152 has been put into the outer container 151 and arranged on the vibration welder 131, prior to welding.

As shown in these drawings, a ring-shaped groove 135a concentric with the center of the concave portion 135c is formed around the concave portion 135c on the lower jig 135 which supports the outer container 151 through the lower work member 135b. Additionally, a ring-shaped groove 133a facing the groove 135a in the lower jig 135 is formed in the upper jig 133 which opposes the lower jig 135 in the vertical direction. A cylindrical rubber ring 137 having parallel and smooth ends to fit with this groove 135a is affixed to this groove 135a. Flexible silicone rubber is suited to use for this rubber ring 137. Additionally, this rubber ring 137 is adhesively attached by means of a cyano-acrylate type adhesive such that the axial direction of the rubber ring 137 is aligned with the drive direction of the air cylinder 138. Since cyano-acrylate type adhesives are airtight and are strongly adhesive, they allow the rubber ring 137 and the lower jig 135 to be held sufficiently airtight. The rubber ring 137 can also be attached to the groove 135a by means of mechanical fixation means such as chucks.

When the upper jig 133 is lowered, the upper surface of the rubber ring 137 contacts the groove 133a and the rubber ring 137 is compressed. The amount of compression is set to approximately 0.1~2 mm, so that the downward movement of the air cylinder 138 is controlled when the rubber ring 137 is compressed. Since the lower surface of this rubber ring 137 is attached, the rubber ring 137 will not come free from the groove 135a even if it is vibrated or bent due to compression when the upper jig 133 is lowered. As the upper jig 133 is lowered to compress the rubber ring 137, a space 148 is able to be formed between the outer container 151 and the inner container 152 held between the lower jig 135 and the upper jig 133. Instead of using the cylindrical shape of the above example for this rubber ring, it is possible to use an O-ring shape as well.

When the lowering of the upper jig 133 is stopped, a gap is formed between the lower jig 135 and the upper jig 133, and a gap 146 is formed between the lower work member 135b and the upper work member 133b.

At least one of the upper jig 133 and the lower jig 135 is made so as to be capable of vibrating by means of vibration generating means not shown in the drawings. This vibration generating means is provided on the upper support stand 132 or the upper jig 133, and/or the lower support stand 134 or the lower jig 135. As shown in FIG. 22, the upper jig 133 is lowered so as to achieve contact between the outer container end portion 151a and the inner container end portion 152a through the projection 151b, and by vibrating the upper jig 133 and/or the lower jig 135 by driving the vibration generating means, the end portions are welded together by generating frictional heat between the inner container end portion 152a and the outer container end portion 151a. The vibrations applied to the upper jig 133 can have a frequency of tens of Hz to tens of thousands of Hz, preferably 50~150 Hz, and the amplitude should be a few mm. The vibration generating means is not especially restricted, so that a vibration generating cylinder or motor can be used.

A gas filler/exhaust route 134b for filling and exhausting the space 148 is formed in the lower jig 135 and the lower support stand 134. This gas filler/exhaust route 134b is connected to a gas filler/exhaust pipe 141, and to the end 141a of this gas filler/exhaust pipe 141, a vacuum pump 142 is connected via a valve 144, and a low thermal conductivity gas filled container 143 is connected via the valve 145. These allow the space 148 to be filled and exhausted through the gas filler/exhaust route 134b and the gap 146. This gas filler/exhaust route 134b is formed so as to pass through the lower jig 135 and the lower support stand 134, and the boundary portion between the lower jig 135 and the lower support stand 134 in the gas filer/exhaust route 134b is held airtight by means of an O-ring or the like.

The shape and size of the synthetic resin inner container 152 and outer container 151 used for the thermally insulated double-walled synthetic resin container manufacturing method of the present invention are not especially restricted, and they may be selected as is appropriate to the various shapes and uses of the thermally insulated double-walled synthetic resin containers to be produced. Additionally, the resin material for forming the inner container 152 and the outer container 151 can be chosen from appropriate materials under consideration of heat resistance, weather resistance, cold resistance, chemical resistance, shock resistance and price, depending upon the use of the thermally insulated double-walled synthetic resin container to be produced. The inner and outer containers can also be formed from an adhesive resistant resin such as polypropylene.

The example of a thermally insulated double-walled synthetic resin container manufacturing method explained below is for the case wherein the inner container 152 and the outer container 151 are bowl-shaped. The inner container 152 and the outer container 151 are extrusion molded from a resin mixed from polycarbonate resin and polyester resin, preferably a mixed resin wherein polycarbonate resin and polyester resin are mixed at a weight ratio of 7:3. This mixed resin has exceptional gas-barrier properties, and cracks will almost never form in the molded resin surface even if washed with detergents or bleaches.

When the outer container 151 is extrusion molded, at least one protrusion 151b is formed in the outer container end portion 151a of the mouth portion with a height of approximately 0.1~1 mm. When a plurality of protrusions 151b are formed, the protrusions 151b should preferably be formed along the circumferential direction spaced at uniform intervals. These protrusions 151b can be provided on the inner container 152 instead of the outer container 151, or can be provided on both the inner and outer containers 151, 152. The present example takes the case wherein three protrusions are formed in the outer container 151.

With the inner container 152 placed inside the outer container 151, the inner container end portion 152a is lifted up by the protrusions 151b provided at the outer container end portion of the mouth portion of the outer container 151, thereby forming a gap 147 between the inner and outer containers. As shown in FIG. 21, the outer container 151 is set on the lower work member 135b of the lower jig 135 with the upper jig 133 in an uplifted state. Since the lower work member 135b is formed so as to be able to support almost the entire outer surface of the outer container 151, the outer container 151 will not shake after the outer container has been set down. Then, the inner container 152 is placed inside the outer container 151 while leaving a gap 147, and the centers of the inner and outer containers are aligned. The inner container end portion 152a is held horizontally by being supported by the three protrusions 151b in the outer container end portion 151a.

Then, the air cylinder 138 is driven to lower the upper jig 133, and almost the entire inner surface of the inner container 152 is pressed by the upper work member 133b. The amount of compression of the rubber ring 137 between the upper jig 133 and the lower jig 135 is preferably set at 0.1~2 mm. When the rubber ring 137 is compressed, the outer container end portion 151a of the outer container 151 supported on the lower work member 135b of the lower jig 135 and the inner container end portion 152a of the inner container 152 pressed by means of the upper work member 133b of the upper jig 133 oppose each other horizontally across the protrusions 151b while maintaining a gap 147 of approximately 0.1~1 mm between the outer container end portion 151a and the inner container end portion 152a by means of the protrusions 151b formed in the outer container end portion 151a. In this way, a space 148 for containing the inner and outer containers is formed in the space between the lower jig 135, the upper jig 133 and the rubber ring 137. This space 148 is connected to the gas filler/exhaust route 134b via the gap 147 between the outer container end portion 151a and the inner container end portion 152a, the gap 146 between the lower work member 135b and the upper work member 133b, and the gap 149 between the upper jig 133 and the lower jig 135.

After closing valve 145 and opening valve 144, this space 148 is evacuated to a pressure of less than 10 mmHg by the vacuum pump 142. Then, valve 144 is closed and valve 145 is opened so as to allow low thermal conductivity gas to pass from the container 143 through the gas filler/exhaust pipe 141 and through the gas filler/exhaust route 134b so as to fill the space 148 at a pressure of approximately atmospheric pressure at room temperature. The influence of residual air can be almost completely eliminated by evacuating the space 148 to less than 10 mmHg.

As a low thermal conductivity gas, at least one type selected from the group consisting of xenon, krypton and argon is used. These can be used either singly or as mixed gases of two or more types. By using these low thermal conductivity gases, the gap between the inner and outer containers can be made as thin as 1~10 mm, while producing a container with excellent thermal insulating capabilities.

Additionally, these gases are inert, so that they are preferable for use in consideration of environmental protection. Additionally, these gases have larger atomic radii than oxygen and nitrogen with are included in air, so that they cannot easily permeate through the walls of the inner and outer containers formed by a mixed resin of polycarbonate and polyester, thus allowing the thermal insulation property of the thermally insulated double-walled synthetic resin container to be maintained for a long period of time.

After filling with low thermal conductivity gas, vibrations for vibration welding are applied to the lower jig 135 and the upper jig 133, so that the outer container end portion 151a and the inner container end portion 152a are welded together due to the frictional heat caused by the vibrations. When the vibrations are applied, the protrusions 151b are the first to melt due to the vibrational friction, then the outer container end portion 151a and the inner container end portion 152a are welded (fused) by means of the vibrational friction. According to this type of welding by vibrational friction, it is possible to seal the end portions of the inner and outer containers in airtight fashion by welding the end surface of the outer container end portion 151a and the end surface of the inner container end portion 152a, so as to result in a thermally insulated double-walled synthetic resin container which is highly airtight and is firmly attached.

Then, the valve 145 should be closed and the residual low thermal conductivity gas remaining in the gas filler/exhaust pipe 141, the gas filler/exhaust route 134b, and the spaces formed between the lower jig 135, the upper jig 133 and the rubber ring 137, should preferably be recovered by a recovery means which is not shown in the drawings.

After the welding of the inner and outer container end portions has been completed, the air cylinder 138 is driven upwards to lift up the upper jig 133, so as to allow the thermally insulated double-walled synthetic resin container to be withdrawn.

Of the outer surface of the inner container 152 and the inner surface of the outer container 151, a radiation prevention material is formed on at least the outer surface of the inner container. By providing this radiation prevention material, the thermal loss due to radiative thermal conduction from the thermally insulated double-walled synthetic resin container can be suppressed. When a radiation prevention material is provided on both the outer surface of the inner container 152 and the inner surface of the outer container 151, the heat loss due to radiative thermal conduction can be held even lower, so as to form a thermally insulated double-walled synthetic resin container with exceptional thermal insulation capabilities.

Figure 24:
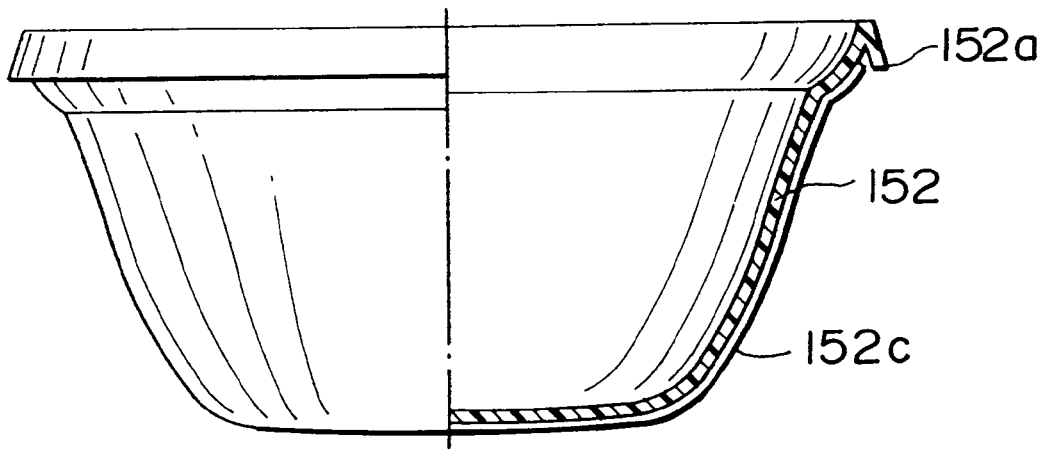
FIG. 24 is a partially cut-away front view showing an example of an inner container.
Figure 25:
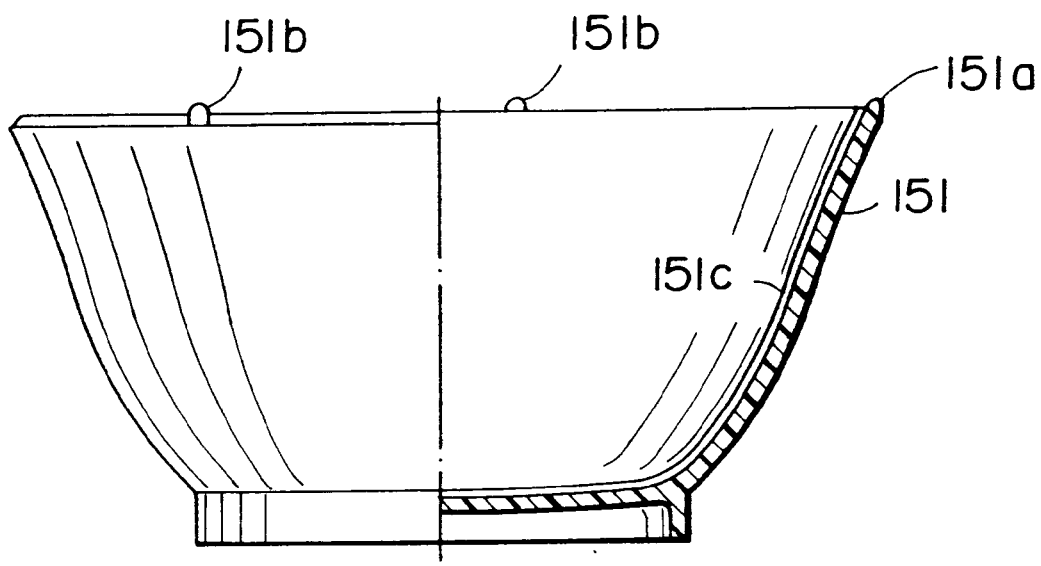
FIG. 25 is a partially cut-away front view showing an example of an outer container.
Figure 26:
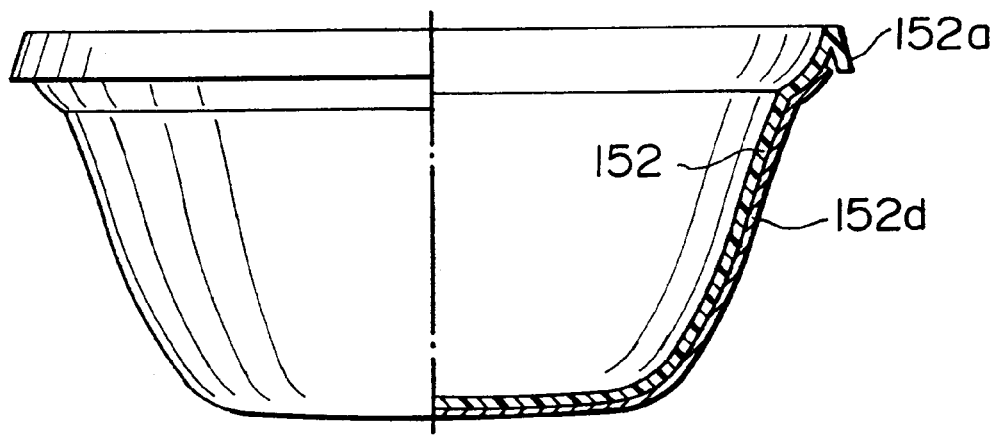
FIG. 26 is a partially cut-away front view showing another example of an inner container.
Figure 27:
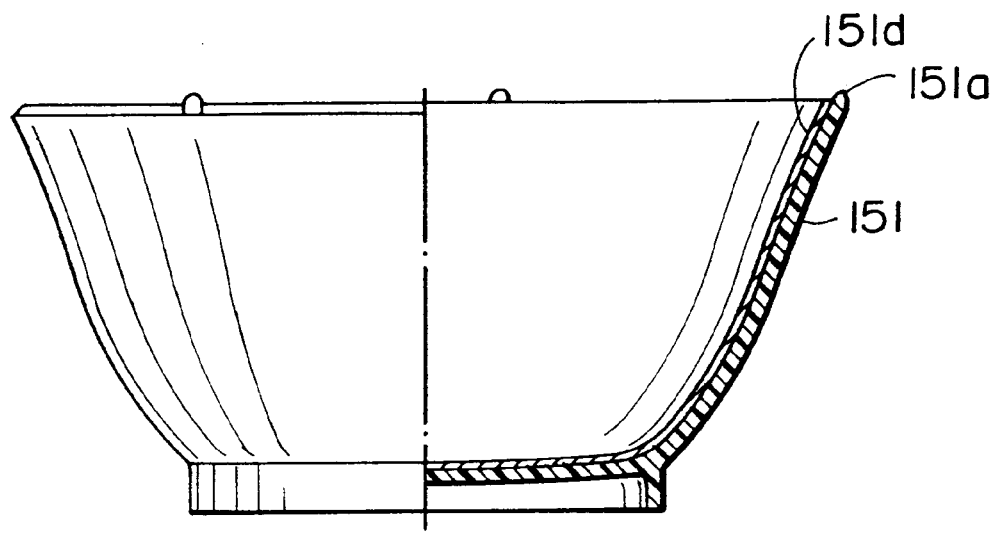
FIG. 27 is a partially cut-away front view showing another example of an outer container.

A metallic film layer to compose the radiation prevention material can be formed either by applying metallic foils 151c, 152c such as aluminum foil, copper foil or silver foil on the outer surface of the inner container 152 and the inner surface of the outer container 151 as shown in FIGS. 24 and 25, or by forming a metallic plating 151d, 152d such as copper plating on the outer surface of the inner container 152 or the inner surface of the outer container 151 as shown in FIGS. 26 and 27.

The metallic foils 151c, 152c such as aluminum foil, copper foil or silver foil can be attached to the outer surface of the inner container 152 or the inner surface of the outer container 151 by means of adhesives or double-sided tape. Additionally, when forming a metallic plating, a 1~50 μm thick copper plating layer can be electroplated on top of a chemically plated nickel film layer. If a plating film is formed, the gas-barrier capabilities can be improved in addition to reducing the radiative thermal conduction.

Next, a manufacturing method for the thermally insulated double-walled synthetic resin lid of the present invention (hereinafter abbreviated as the thermally insulated lid) will be explained with reference to FIGS. 21, 28 and 29.

In order to make this lid for a double-walled container, a vibration welder 131 as shown in FIG. 21 can be used by replacing the lower jig 135 and the upper jig 133 used to make the thermally insulated double-walled synthetic resin container. An upper jig 173 for the thermally insulated lid is attached to the upper support stand 132, and a lower jig 175 is attached to lower support stand 134.

A concave portion 175*c* is formed in the lower jig 175, and a lower work member 175*b* which supports almost the entire outer surface of the top wall 161 of the thermally insulated lid is attached to this concave portion 175*c*. Additionally, a convex portion 173*c* is formed on the upper jig 173, and an upper work member 173*b* which supports almost the entire inner surface of the bottom wall 162 of lid for the double-walled container is attached to this convex portion 173*c*.

Figure 28:
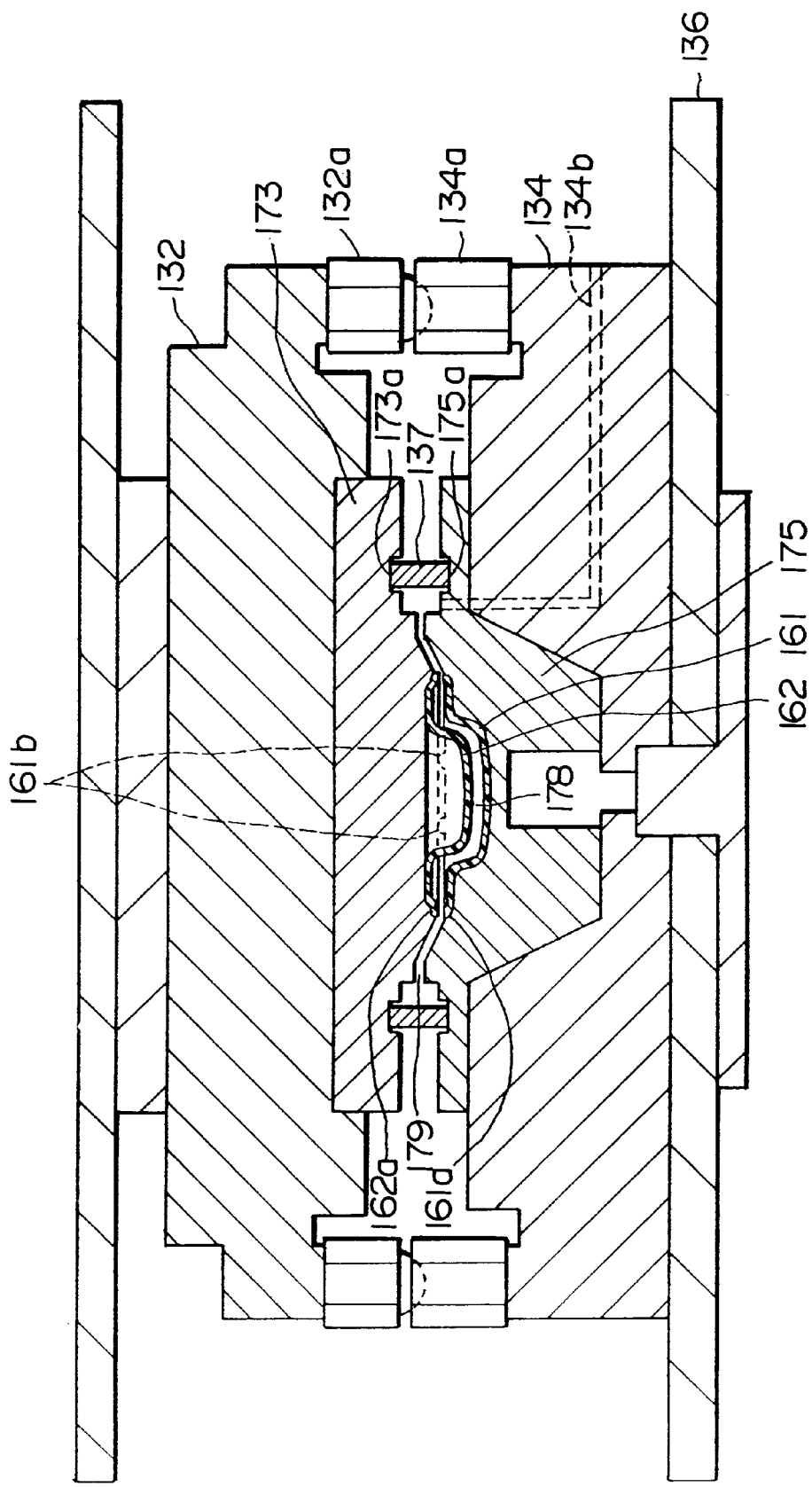
FIG. 28 is a portional section view showing a manufacturing method for a thermally insulated double-walled synthetic resin lid according to the present invention during manufacture.
Figure 29:
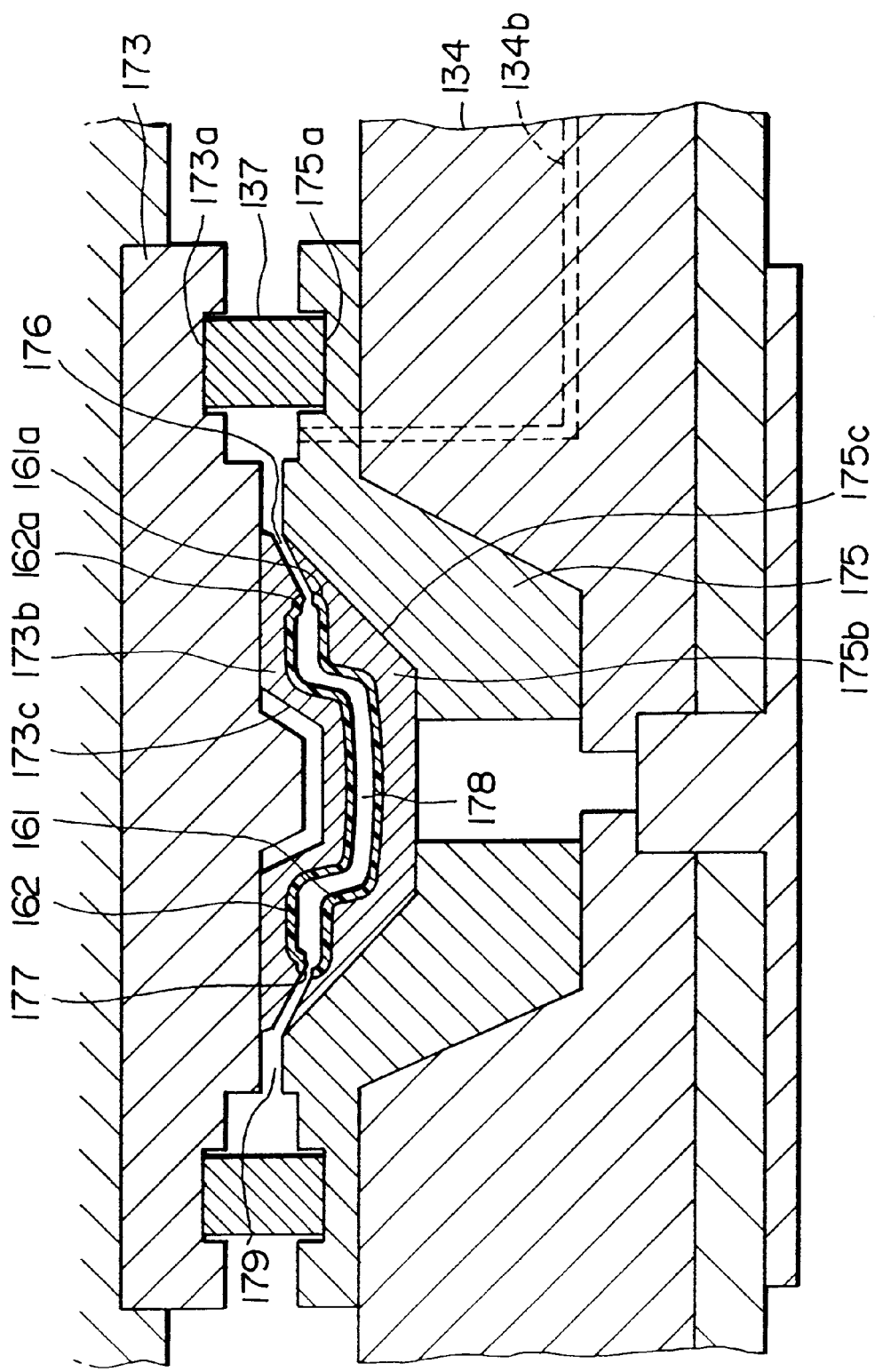
FIG. 29 is a portional section view showing the apparatus of FIG. 28.

FIGS. 28 and 29 show the state wherein the bottom wall 162 and the top wall 161 are arranged in the vibration welder 131 and are pinched between the lower jig 175 and the upper jig 173 with their end portions in mutual contact, prior to welding.

As shown in these drawings, a ring-shaped groove 175*a* concentric with the center of the concave portion 175*c* is formed around the concave portion 175*c* of the lower jig 175, and a groove 173*a* opposing the groove 175*a* is formed in the upper jig 173. Then a rubber ring 137 is affixed to the groove 175*a*.

When the upper jig 173 is lowered, this rubber ring 137 contacts the groove 173*a* to compress the rubber ring 137, and the amount of compression is set to approximately 0.1~2 mm as with the formation of the double-walled container.

When the rubber ring 137 has been compressed and the upper jig 173 has stopped lowering, a gap 179 is formed between the lower jig 175 and the upper jig 173, and a gap 176 is formed between the lower work member 175*b* and the upper work member 173*b*. Additionally, a gap 177 is also formed between the respective end portions 161*a*, 162*a* of the top wall 161 supported by the lower work member 175*b* and the bottom wall 162 supported by the upper work member 173*b* due to the protrusions 161*b*.

At least one of the upper jig 173 and the lower jig 175 is made capable of vibrating by means of the vibration generating means which is not shown in the drawings. With this vibration generating means, the upper jig 173 can be lowered as shown in FIG. 28 so that the top wall end portion 161*a* and the bottom wall end portion 162*a* achieve contact through the protrusions 161*b*, then by vibrating the vibration generating means to vibrate the upper jig 173 and/or the lower jig 175, frictional heat can be generated between the top wall end portion 161*a* and the bottom wall end portion 162*a* so as to weld their end portions together.

A gas filler/exhaust route connected to the gas filler/exhaust route 134*b* of the lower support stand 134 is formed in the lower jig 175, and one end thereof is connected to the space 178 formed between the lower jig 175 and the upper jig 173 when the rubber ring 137 is compressed.

The shape and size of the synthetic resin top wall 161 and bottom wall 162 used in the thermally insulated lid manufacturing method of the present invention is set so as to be just right for covering the mouth portion of the container to be used by covering with the thermally insulated lid, such as the thermally insulated double-walled synthetic resin container. Additionally, as the resin material for forming the top wall 161 and the bottom wall 152, any suitable material can be used in consideration of heat resistance, weather resistance, cold resistance, chemical resistance, shock resistance and price depending upon the use of the thermally insulated lid to be produced.

The example of a thermally insulated lid manufacturing method explained below takes the case wherein the top wall 161 and the bottom wall 162 are hat-shaped. The top wall 161 and the bottom wall 162 are extrusion molded from the resin indicated in the description of the manufacturing method for the thermally insulated double-walled synthetic resin container, that is, a mixed resin of polycarbonate resin and polyester resin.

When the top wall 161 is extrusion molded, at least one protrusion 161*b* having a height of approximately 0.1~1 mm is formed on the top wall end portion 161*a*. These protrusions 161*b* can be provided in the bottom wall end portion 162*a* instead of the top wall end portion 161*a*, or can be provided on both the top and bottom wall end portions 161*a*, 162*a*. In this example, three protrusions 161*b* are formed which are uniformly spaced around the periphery of the top wall end portion 161*a*.

As shown in FIG. 21, the top wall 161 is placed on the lower work member 175*b* of the lower jig 175 with the outer surface (top surface) facing downward, while the upper jig 173 is in an uplifted state. Next, the bottom wall 162 is placed on the top wall 161 with the inner surface (bottom surface) facing upward, with the centers of the top and bottom walls 161, 162 in alignment. The bottom wall end portion 162*a* is supported horizontally by the three protrusions in the top wall end portion 161*a*.

Then, the upper jig 173 is lowered by driving the air cylinder 138, so that almost the entire inner surface of the bottom wall 172 is pressed by means of the upper work member 173*b*. The amount of compression of the rubber ring 137 between the upper jig 173 and the lower jig 175 is preferably set at approximately 0.1~2 mm. When the rubber ring 137 is compressed, the top wall end portion 161*a* of the outer container 161 supported on the lower work member 175*b* of the lower jig 175 and the bottom wall end portion 162*a* of the inner container 162 pressed by means of the upper work member 173*b* of the upper jig 173 oppose each other horizontally across the protrusions 161*b* while maintaining a gap of approximately 0.1~1 mm between the top wall end portion 161*a* and the bottom wall end portion 162*a* by means of the protrusions 161*b* formed in the top wall end portion 161*a*. In this way, a space 178 for containing the top and bottom walls 161, 162 is formed in the space between the lower jig 175, the upper jig 173 and the rubber ring 137. This space 178 is connected to the gas filler/exhaust route 134*b* via the gap 177 between the top wall end portion 161*a* and the bottom wall end portion 162*a*, the gap 176 between the lower work member 175*b* and the upper work member 173*b*, and the gap 179 between the upper jig 175 and the lower jig 173.

After closing valve 145 and opening valve 144, this space 178 is evacuated to a pressure of less than 10 mmHg by the vacuum pump 142. Then, valve 144 is closed and valve 145 is opened so as to allow low thermal conductivity gas to pass from the container 143 through the gas filler/exhaust pipe 141 and through the gas filler/exhaust route 134*b* so as to fill the space 178 at a pressure of approximately atmospheric pressure at room temperature.

As a low thermal conductivity gas, at least one type selected from the group consisting of xenon, krypton and argon is used. By using these low thermal conductivity gases, the gap between the inner and outer containers can be made as thin as 1~10 mm, while producing a container with excellent thermal insulating capabilities.

After filling with low thermal conductivity gas, vibrations for vibration welding are applied to the lower jig 175 and the upper jig 173, so that the top wall end portion 161a and the bottom wall end portion 162a are welded together due to the frictional heat caused by the vibrations. According to this type of welding by vibrational friction, it is possible to seal the end portions of the top and bottom walls 161, 162 in airtight fashion by welding together the surfaces of the top wall portion 161a and the bottom wall end portion 162a, as well as to form a connecting section which is firmly attached.

Then, the valve 145 can be closed and the upper jig 173 can be lifted up by driving the air cylinder 138 upward, so as to allow the thermally insulated lid to be withdrawn.

Of the inner surface (bottom surface) of the top wall 161 and the outer surface (top surface) of the bottom wall 162, a radiation prevention material composed of a metallic film is formed on at least the outer surface of the bottom wall. By providing this radiation prevention material, the thermal loss due to radiative thermal conduction from the thermally insulated double-walled synthetic resin container can be suppressed, so as to increase the thermal insulation and heat preserving capabilities.

Figure 30:
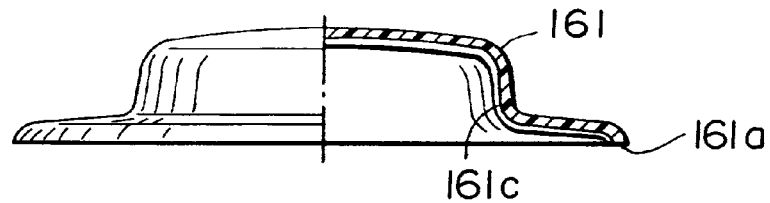
FIG. 30 is a partially cut-away front view showing an example of a top wall.
Figure 31:
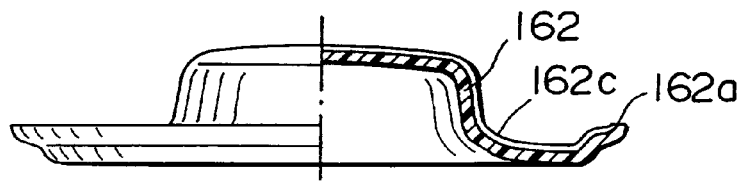
FIG. 31 is a partially cut-away front view showing an example of a bottom wall.

A metallic film layer to compose the radiation prevention material can be formed either by applying metallic foils 161c, 162c such as aluminum foil, copper foil or silver foil on the inner surface of the top wall 161 and the outer surface of the bottom wall 162 as shown in FIGS. 30 and 31, or by forming a metallic plating 161d, 162d such as copper plating on the inner surface of the top wall 161 or the outer surface of the bottom wall 162.

The thermally insulated double-walled synthetic resin container manufacturing method and the thermally insulated double-walled synthetic resin lid manufacturing method of the present invention are not necessarily restricted to the above examples, and various changes are possible. For example, while the inner container end portion and the outer container end portion were welded (fused) together in the thermally insulated double-walled synthetic resin container manufacturing method, and the top wall end portion and the bottom wall end portion were welded (fused) together in the thermally insulated double-walled synthetic resin lid manufacturing method, by means of vibration welding, the inner container end portion can be welded to the outer container end portion and the top wall end portion can be welded to the bottom wall end portion by means of ultrasonic welding, spin welding or hot plate welding, or the inner container end portion can be welded to the outer container end portion and the top wall end portion can be welded to the bottom wall end portion, by means of fusion due to localized heating in a short time by infrared heating, laser beam heating or ultrasonic heating.

While a plurality of protrusions were provided on the outer container end portion in the example for the thermally insulated double-walled synthetic resin container manufacturing method, and a plurality of protrusions were provided on the top wall end portion in the example for the thermally insulated double-walled synthetic resin lid manufacturing method, the structure may be such as to omit the protrusions.

EMBODIMENTS

Embodiment 1

The container 1 shown in FIG. 1 was made and its thermal insulation performance was evaluated.

The outer container 2 and the inner container 3 were each made by extrusion molding with a mixed resin of polycarbonate and polyethylene terephthalate at a weight ratio of 7:3. Then, with the exception of the connection portion between the inner and outer containers and the hole portion 8, the inner surface of the outer container 2 and the outer surface of the inner container 3 were coated with ABS coating, put through a plating procedure to apply a chemical copper plating, then electrically copper plated to form a plating film.

Next, a double-walled container was made by attaching the outer container 2 and the inner container 3 at their respective end portions 6, 7 by means of vibration welding. Then, the double-walled container was overturned and a gas exchange sealing apparatus having a connecting pipe, with packing at the tip, switchably connecting an exhaust pipe communicating with a vacuum pump and a krypton gas supply pipe. With the packing at the tip of the connecting pipe pushed against the area around the hole portion 8 of the double-walled container, the air was vacuum exhausted from the space portion 4 through the hole portion 8, then the space portion 4 was filled with krypton gas at a pressure of approximately atmospheric pressure. Immediately after the gas was filled, the packing was removed and a cyanoacrylate adhesive was dripped into the hole portion 8, after which a sealing panel 9 coated with the same adhesive on one side was inserted into the concave portion 10 around the hole portion 8 to be adhesively affixed, so as to completely seal the hole portion 8 and protect the hole portion 8.

The container 1 made in the above manner has a low cost of production, and offered excellent thermal insulation performance and durability over a long period of time.

(Evaluation of Thermal Insulation Performance)

Hot water of 95° C. was put into the resulting container 1, then covered by a lid 21 filled with thermal insulator material composed of polystyrene foam. When the water temperature was measured after one hour, the temperature was 75° C.

Embodiment 2

An outer container 32 and inner container 33 forming a container 31 with the structure shown in FIGS. 2 and 3 were made by extrusion molding with hot-water resistant polycarbonates.

When forming the outer container 32, a protrusion portion 41 and a depression portion 40 were formed in the center of the outer container bottom portion 38. The diameter of the depression portion 40 was 10 mm, and the thickness of the outer container bottom portion 38 was held approximately uniform. Additionally, the diameter of the hole portion 42 on the protrusion portion 41 side of the center of the outer container bottom portion 38 was made 1 mm, and the diameter on the depression portion 40 side was made 3 mm, so that the hole portion 42 was formed so as to decrease in diameter from the depression portion 40 side to the protrusion portion 41 side.

When this hole portion 42 was formed, the end portion 44b of the hole-opening protrusion portion 44 of the female mold 43 was inserted 2~3 mm into the extrusion molding gate 46 of the male mold 45. Then, an extrusion molding gate 46 having a gate diameter of 4 mm was provided on the male mold 45. Then, the tip of the hole-opening protrusion portion 44 of the female mold 43 was inserted into the extrusion molding gate 46 of the male mold 45, the connecting surfaces of the male mold 45 and the female mold 43 were brought together, and mixed resin was extruded into the extrusion molding space portion 47 to form the outer container 32. Since a gate pin remains at the center of the inner surface of the outer container 32 after molding, this gate pin is cut to form the hole portion 42.

Next, the inner container 33 was formed by using a male mold for forming the inner surface and a female mold for forming the outer surface of the inner container, and providing an extrusion molding gate at a position corresponding to the center of the bottom portion of the inner container 33 on the female mold side.

Subsequently, a copper plating was applied to the inner surface of the outer container 32 and the outer surface of the inner container 33 for the purposes of reducing the radiative thermal conduction and providing gas-barrier properties.

Thereafter, the outer container 32 and the inner container 33 were attached at their respective mouth portions 36, 37 by means of a vibration welding method to obtain a container 31. Then, this container 31 was overturned, and a gas exchange sealing apparatus having a connecting pipe, with packing at the tip, switchably connecting an exhaust pipe communicating with a vacuum pump and a krypton gas supply pipe. With the packing at the tip of the connecting pipe pushed against the area around the hole portion 42 of the double-walled container, the air was vacuum exhausted from the space portion 34 through the hole portion 42, then the space portion 34 was filled with krypton gas at a pressure of approximately atmospheric pressure. Immediately thereafter, a cyano-acrylate adhesive was dripped into the hole portion 42, the depression portion 40 was coated with adhesive, and the sealing panel 39 was fitted and adhered to complete the seal.

The container 31 produced in the above manner almost never has production defects, has low manufacturing costs, excels in terms of strength and appearance, and allows a highly durable and exceptionally thermally insulative container 31 to be obtained.

(Evaluation of Thermal Insulation Performance)

Hot water of 95° C. was put into the resulting container 1, then covered by a lid filled with thermal insulator material composed of polystyrene foam. When the water temperature was measured after one hour, the temperature was 75° C.

Embodiment 3

The container 61 and lid 81 shown in FIG. 6 were made. First, in order to make the container 61, the outer container 62 and the inner container 63 were respectively made by extrusion molding with a mixed resin of polycarbonate and polyethylene terephthalate. After forming a nickel plating on the inner surface of the outer container 62 and the outer surface of the inner container 63 by means of chemical plating, a glossy copper electroplating having a thickness of approximately 15 $\mu$m was formed. At that time, the thickness of the glossy copper electroplating at parts a and b in the area around the mouth portion 75 of the outer surface of the inner container 63 was made approximately 5 $\mu$m.

Next, a double-walled container was made by attaching the outer container end portion 66 and the inner container end portion 67 by means of a vibration welding method. The space portion 64 of the resulting double-walled container 64 was approximately 5 mm.

Then, the double-walled container was overturned, and a gas exchange sealing apparatus having a connecting pipe, with packing at the tip, switchably connecting an exhaust pipe communicating with a vacuum pump and a krypton gas supply pipe. With the packing at the tip of the connecting pipe pushed against the area around the hole portion 68 of the double-walled container, the air was vacuum exhausted from the space portion 64 through the hole portion 68, then the space portion 64 was filled with krypton gas at a pressure of approximately atmospheric pressure. Immediately after the gas was filled, the packing was removed and a cyano-acrylate adhesive was dripped into the hole portion 68, after which a sealing panel 69 coated with the same adhesive on one side was inserted into the concave portion 70 around the hole portion 68 to be adhesively affixed, so as to completely seal the hole portion 68 and protect the hole portion 68.

Additionally, in order to make the lid 81, a bottom wall 82 and a top wall 83 were respectively made by extrusion molding with a mixed resin of polycarbonate and polyethylene terephthalate. After forming a nickel plating on the inner surface of the bottom wall 82 and the outer surface of the top wall 83 by means of chemical plating, a glossy copper electroplating having a thickness of approximately 15 $\mu$m was formed. At that time, the thickness of the glossy copper electroplating at part c in the area around the peripheral portion 90 of the outer surface of the bottom wall 82 was made approximately 5 $\mu$m. Next, a lid having a double-walled structure was made by attaching the bottom wall end portion 88 and the top wall end portion 89 by means of vibration welding. The thickness of the space portion 84 of the resulting lid was 5 mm.

Then, this lid was placed on the gas exchange sealing apparatus and the air was evacuated from the space portion 84 through the hole portion in the central portion of the top wall, after which the space portion 84 was filled with krypton gas at approximately atmospheric pressure at room temperature, a cyano-acrylate type adhesive was dripped into the hole portion 68, the same adhesive was coated onto one surface of a sealing panel which was then adhesively affixed to the area around the hole portion, and the hole portion was completely sealed in order to protect the hole portion.

The container 61 and the lid 81 produced in the above manner exhibited remarkable thermal insulation performance in comparison to conventional heat preserving containers. The heat preserving capabilities of the container combining the container 61 and the lid 81 thus produced was measured in comparison to a commercially available air-insulated container, a commercially available urethane-insulated container, and a container identical to the present invention except with a plating thickness of 25 $\mu$m at the mouth (mouth plating 25 $\mu$m).

The test conditions were such as to put 300 cc of hot water at 95° C. into each container under room temperature (20° C.) conditions, and to measure the water temperature over time. The results are shown in FIG. 34.

Figure 34:
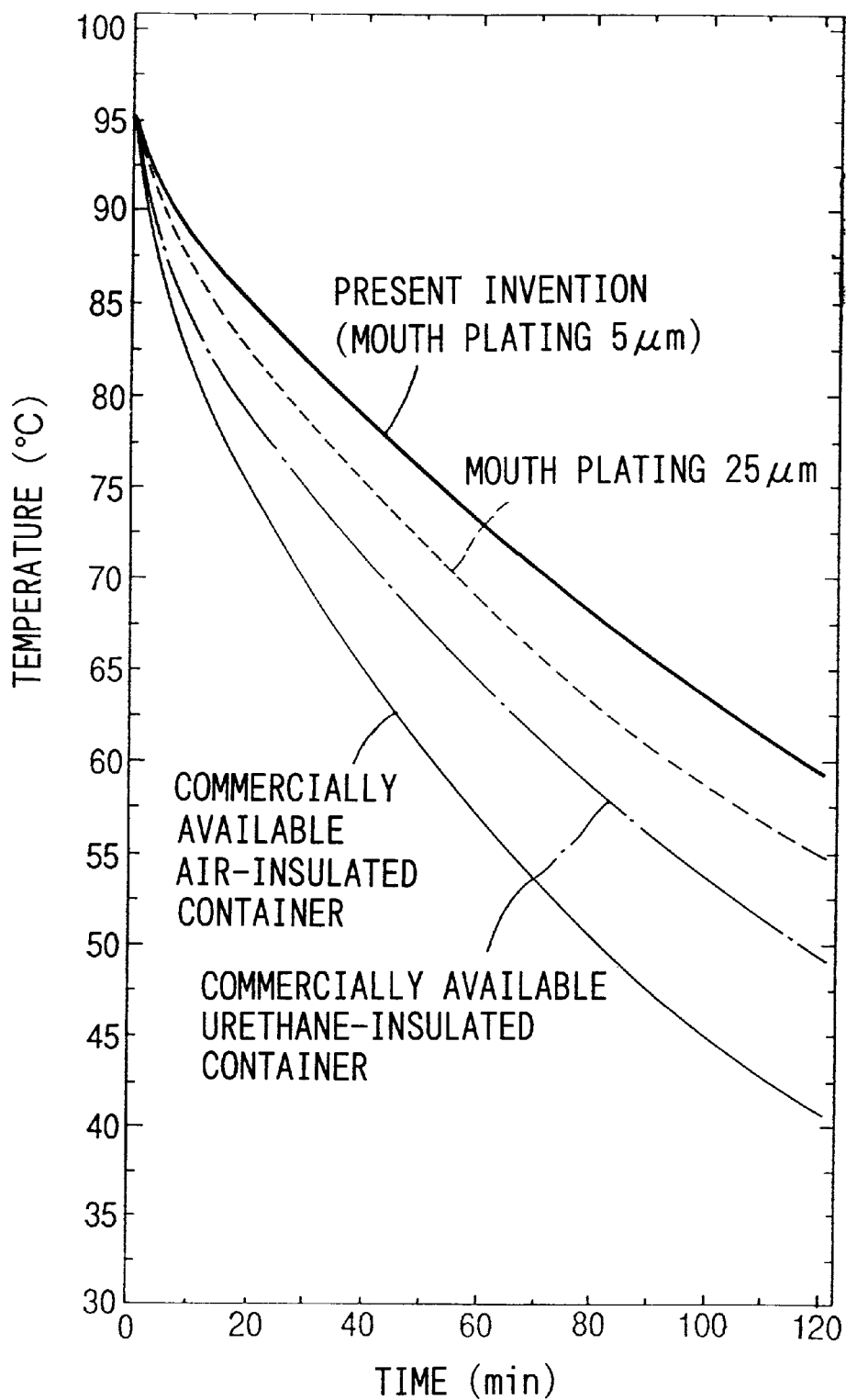
FIG. 34 is a graph showing the results of a test of the heat preserving capabilities of the embodiments.

As is clear from FIG. 34, the container of the present invention exhibited superior heat preserving capabilities in comparison to the conventional air-insulated container and urethane-insulated container. Additionally, the container having a mouth plating thickness of 25 $\mu$m had inferior heat preserving capabilities in comparison to the product of the present invention (mouth plating thickness 5 $\mu$m).

Embodiment 4

Using the vibration welder 131 shown in FIG. 21, a thermally insulated double-walled synthetic resin container was made using the inner container 152 and the outer container 151 shown in FIGS. 26 and 27.

The inner container 152 and the outer container 151 were extrusion molded with a mixed resin mixed from polycarbonate resin and polyester resin at a weight ratio of 7:3. After forming a Ni substrate layer on the outer surface of the inner container 152 and the inner surface of the outer container 151 by means of chemical plating, a 10 μm thick Cu plating was formed by means of electroplating. The outer container 151 had a mouth portion outer diameter of 140 mm and a height of 70 mm, while the inner container had a mouth portion outer diameter of 135 mm (the maximum outer diameter of the end portions was 140 mm) and a height of 60 mm. Three uniformly spaced protrusions having a height of 0.5 mm were formed on the outer container 151 end portion. The inner container 152 and the outer container 151 were designed so that the gap between the inner and outer containers was 3~5 mm after their respective end portions were welded together.

The inner container 152 and the outer container 151 were placed within the vibration welder 131, the upper jig 133 was lowered so that almost the entire inner surface of the inner container 152 was pressed by means of the upper work member 133b of the upper jig 133, and the lowering of the upper jig 133 was stopped when the upper end of the rubber ring 137 was inserted into the groove 133a in the upper jig 133 and the rubber ring 137 was compressed to approximately 1 mm.

Next, the space 148 was vacuum exhausted to approximately 1 Torr by means of the vacuum pump 142, then the space 148 was filled with krypton (Kr) gas from the container 143 to approximately atmospheric pressure. Subsequently, vibrations having a frequency of approximately 100 Hz and an amplitude of approximately 2 mm were applied to the upper jig 133 by means of a vibration generating means (not shown in the drawings) so as to generate frictional heat between the inner container end portion 152a and the outer container end portion 151a to weld the end portions together. After the welding was completed, the upper support stand 132 was raised and the thermally insulated double-walled synthetic resin container was withdrawn.

Figure 32:
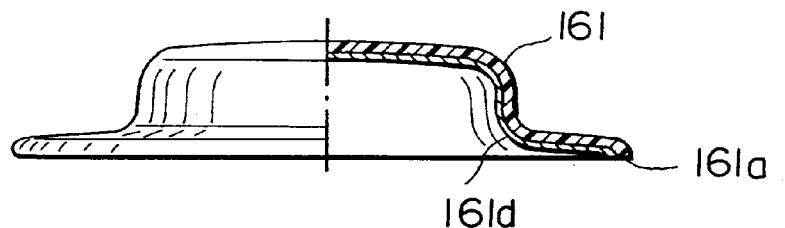
FIG. 32 is a partially cut-away front view showing another example of a top wall.
Figure 33:
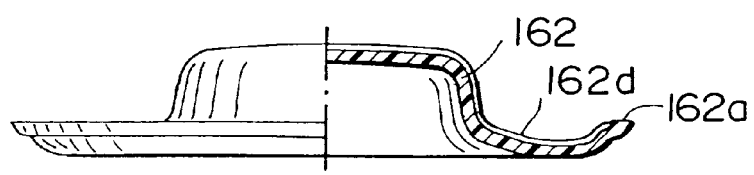
FIG. 33 is a partially cut-away front view showing another example of a top wall.

Next, the vibration welder shown in FIG. 21 was used to make a thermally insulated double-walled synthetic resin lid from the top wall 161 and the bottom wall 162 shown in FIGS. 32 and 33.

The top wall 161 and the bottom wall 162 were extrusion molded with a mixed resin mixed from polycarbonate resin and polyester resin at a weight ratio of 7:3. After forming a Ni substrate layer on the inner surface of the top wall 161 and the outer surface of the bottom wall 162 by means of chemical plating, a 10 μm thick Cu plating was formed by means of electroplating. The top wall 161 had an end portion outer diameter of 130 mm and a height of 23 mm, while the bottom wall 162 had an end portion outer diameter of 130 mm and a height of 20 mm. Three uniformly spaced protrusions having a height of 0.5 mm were formed on the top wall 161 end portion. The top wall 161 and the bottom wall 162 were designed so that the gap between the top and bottom walls was 3~5 mm after their respective end portions were welded together.

On the vibration welder 131, an upper jig 173 was attached to the upper support stand 132 and a lower jig 175 was attached to the lower support stand 135. The top wall 161 and the bottom wall 162 were placed within the vibration welder 131, the upper jig 173 was lowered so that almost the entire inner surface of the bottom wall 162 was pressed by means of the upper work member 173b of the upper jig 173, and the lowering of the upper jig 173 was stopped when the upper end of the rubber ring 137 was inserted into the groove 173a in the upper jig 173 and the rubber ring 137 was compressed to approximately 1 mm.

Next, the space 178 was vacuum exhausted to approximately 1 Torr by means of the vacuum pump 142, then the space 178 was filled with krypton (Kr) gas from the container 143 to approximately atmospheric pressure. Subsequently, vibrations having a frequency of approximately 100 Hz and an amplitude of approximately 2 mm were applied to the upper jig 173 by means of a vibration generating means (not shown in the drawings) so as to generate frictional heat between the top wall end portion 161a and the bottom wall end portion 162a to weld the end portions together. After the welding was completed, the upper support stand 132 was raised and the thermally insulated double-walled synthetic resin lid was withdrawn.

The thermally insulated double-walled synthetic resin container and the thermally insulated double-walled synthetic resin lid produced in this way have completely unified inner and outer containers and top and bottom walls, with connecting portions which are perfectly attached so as to have an exceptional outward appearance. Additionally, 300 cc of hot water at a temperature of 95° C. was put into the produced thermally insulated double-walled container and covered by the produced thermally insulated double-walled lid in order to evaluate their heat preserving capabilities. As a result, the water temperature was measured to be 72° C. after the passage of one hour, thus confirming that they have excellent heat preserving capabilities.

We claim:

1. A thermally insulated double-walled synthetic resin lid for covering a mouth of a container, comprising a top wall and bottom wall composed of synthetic resin, which are arranged with a space portion therebetween and attached at their peripheral portions in an airtight double-walled structure; wherein said top wall has a cylindrical protrusion portion which protrudes upward from a central portion;

a thermal insulator layer filling said space portion of at least one type of low thermal conductivity gas selected from the group consisting of xenon, krypton and argon;

a cylindrical protrusion portion which protrudes upward toward said space portion formed at a central portion of said bottom wall; and the inner diameter of said cylindrical protrusion portion on said bottom wall is greater than the outer diameter of the protrusion portion on said top wall.

2. A thermally insulated double-walled synthetic resin lid according to claim 1, wherein said lid has a notch formed in a radial direction of said peripheral portion.

3. A thermally insulated double-walled synthetic resin lid according to claim 1, wherein the thickness of said space portion is 5–10 mm at parts aside from said peripheral portion, the base of the top wall protrusion portion and the base of the bottom wall protrusion portion.

4. A thermally insulated double-walled synthetic resin lid according to claim 1, wherein the shape of the top wall protrusion portion is one of cylindrical and polygonal column-shaped.

5. A thermally insulated double-walled synthetic resin lid according to claim 1, wherein a radiation prevention material composed of metal is provided on at least one selected from the group consisting of surfaces of said top wall and said bottom wall which face said space portion.

6. A thermally insulated double-walled synthetic resin lid according to claim 5, wherein said radiation prevention material is one type selected from the group consisting of a plating film, aluminum foil, copper foil and silver foil.

7. A thermally insulated double-walled synthetic resin lid according to claim 1 further comprising a metal radiation prevention material on at least a part of the inner surface of at least one of said top and bottom walls facing said space portion.

8. A thermally insulated double-walled synthetic resin lid according to claim 7, wherein said radiation prevention material comprises a metallic thin film layer provided on portions of the surfaces which face said space portion except for the areas around the peripheral portion.

9. A thermally insulated double-walled synthetic resin lid according to claim 7, wherein said thermal insulator layer has a thickness of 1–10 mm.

10. A thermally insulated double-walled synthetic resin lid according to claim 8, wherein a copper plating film having a thickness of 1~10 μm, thinner than said metallic thin film layer, is formed at said areas around said peripheral portion.

11. A thermally insulated double-walled synthetic resin lid according to claim 8, wherein said metallic thin film layer is composed of metallic foil.

12. A thermally insulated double-walled synthetic resin lid according to claim 11, wherein said metallic foil is one of copper foil and aluminum foil.

13. A thermally insulated double-walled synthetic resin lid according to claim 8, wherein said metallic thin film layer is composed of a copper plating film.

14. A thermally insulated double-walled synthetic resin container according to claim 13, wherein said copper plating film has a thickness of 10~50 μm.

15. A thermally insulated double-walled synthetic resin lid according to claim 1, wherein said top wall and said bottom wall are formed from a chemically resistant resin.

* * * * *